US012770775B2

(12) United States Patent
Tal et al.

(10) Patent No.: US 12,770,775 B2
(45) Date of Patent: Oct. 20, 2026

(54) INVERTER APPARATUS

(71) Applicant: Solaredge Technologies Ltd., Herzeliya (IL)

(72) Inventors: Nikolay Tal, Karmiel (IL); Tzachi Glovinsky, Petah Tikva (IL)

(73) Assignee: Solaredge Technologies Ltd., Herzeliya (IL)

( * ) Notice: Subject to any disclaimer, the term of this patent is extended or adjusted under 35 U.S.C. 154(b) by 150 days.

(21) Appl. No.: 18/419,978

(22) Filed: Jan. 23, 2024

(65) Prior Publication Data

US 2024/0161964 A1 May 16, 2024

Related U.S. Application Data

(63) Continuation of application No. 17/124,555, filed on Dec. 17, 2020, now Pat. No. 11,923,122.

(60) Provisional application No. 62/949,607, filed on Dec. 18, 2019.

(51) Int. Cl.
*H01F 27/28* (2006.01)
*H01F 27/26* (2006.01)

(52) U.S. Cl.
CPC ............. *H01F 27/28* (2013.01); *H01F 27/26* (2013.01)

(58) Field of Classification Search
CPC ...... H02M 7/00; H02M 7/162; H02M 7/1623; H02M 7/1626; H02M 7/17; H02M 7/219; H02M 7/2195; H02M 7/75; H02M 7/23; H02M 7/42
See application file for complete search history.

(56) References Cited

U.S. PATENT DOCUMENTS 9,413,221 B1 * 8/2016 Kim ...................... H02M 7/217
11,211,897 B2 * 12/2021 Jin .......................... H02J 3/381
2009/0116266 A1 * 5/2009 Lai ........................ H02M 7/493 363/40
2011/0075454 A1 * 3/2011 Jones ...................... H02M 3/22 363/67
2011/0103100 A1 5/2011 Hosotani
2020/0021113 A1 * 1/2020 Chen ....................... H02S 40/38

FOREIGN PATENT DOCUMENTS

CN 203119768 U 8/2013
JP 2001237126 A 8/2001
JP 2010104069 A 5/2010
KR 100978921 B1 8/2010

OTHER PUBLICATIONS

May 20, 2021—European Search Report—EP 20214725.2.
May 15, 2023—European Office Action—EP App No. 20214725.2.

* cited by examiner

*Primary Examiner* — Nguyen Tran
(74) *Attorney, Agent, or Firm* — Banner & Witcoff, Ltd.

(57) ABSTRACT

Systems, apparatuses, and methods are described for an inverter which receives a direct current (DC) input, and outputs an alternating current (AC) output. A high AC voltage is achieved by serially connecting AC outputs from inversion modules included in the inverter. Multiple inversion stages are serially connected in order to form the AC output. Windings around a common core of the inverter may cause ripple currents to be shared by the inversion modules. Utilizing a common core enables reducing low frequency ripple currents.

20 Claims, 16 Drawing Sheets

INVERTER APPARATUS

CROSS-REFERENCE TO RELATED APPLICATIONS

This application is a continuation of U.S. application Ser. No. 17/124,555, filed Dec. 17, 2020, which claims priority to U.S. Provisional Patent Application No. 62/949,607, filed Dec. 18, 2019. The entire disclosures of the foregoing applications are incorporated by reference in their entireties.

BACKGROUND

A power inverter, or inverter, is a power electronic device or circuitry that changes direct current (DC) to alternating current (AC). The resulting AC frequency obtained depends on the particular device employed. Inverters do the opposite of "converters" which were originally large electromechanical devices converting AC to DC. The input voltage, output voltage and frequency, and overall power handling depend on the design of the specific device or circuitry. The inverter does not produce any power; the power is provided by the DC source. A power inverter can be entirely electronic or may be a combination of mechanical effects (such as a rotary apparatus) and electronic circuitry. Static inverters do not use moving parts in the conversion process. Power inverters are primarily used in electrical power applications where high currents and voltages are present.

SUMMARY

The following summary presents a simplified summary of certain features. The summary is not an extensive overview and is not intended to identify key or critical elements.

An inverter is described, the inverter having a magnetic core including at least two legs, two or more primary windings, and two or more secondary windings, a first one of the two or more primary windings and a first one of the two or more secondary windings include a first isolation stage, a second one of the two or more primary windings and a second one of the two or more secondary windings include a second isolation stage, the first one of the two or more primary windings and the second one of the two or more primary windings are wound on a first leg of the at least two legs, the first one of the two or more primary windings wound on a first portion of the first leg, and the second one of the two or more primary windings is wound on a second portion of the first leg, and the second one of the two or more secondary windings and the first one of the two or more secondary windings are wound on a second leg of the at least two legs, the second one of the two or more secondary windings wound on a second portion of the second leg and the first one of the two or more secondary windings wound on a first portion of the second leg.

Systems, apparatuses, and methods are described for an inverter which receives a direct current (DC) input, and outputs an alternating current (AC) output. A high-amplitude AC voltage is achieved by serially connecting AC outputs from inversion modules included in the inverter. Multiple inversion stages are serially connected in order to form the AC output. Windings around a common core of the inverter may cause ripple currents, in the DC input, to be shared by the inversion modules.

Ripple currents may cause higher root mean square current, resulting in conduction losses (e.g., heating of components), and, as a consequence, there may be a need to use larger conductors in inverter circuitry. Additionally, ripple currents may cause damage to inverter circuitry. Regulatory concerns may require reductions of ripple currents to avoid potential hazards resulting from such damage.

Methods and systems for connecting the windings are described herein below.

Related systems and apparatuses are also described.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
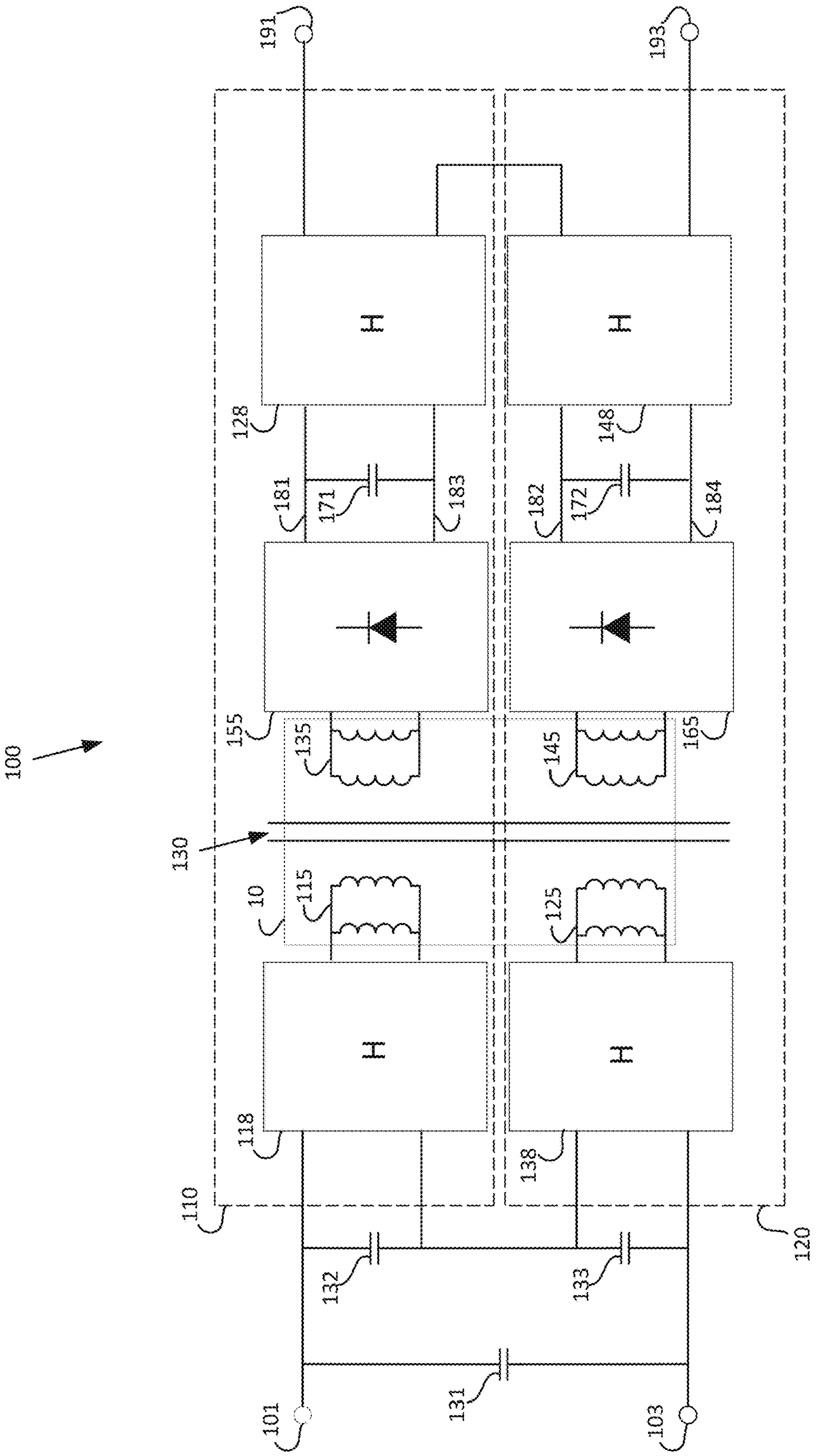
FIG. 1A shows a high-level schematic drawing of a special transformer in an inverter as described herein below.

The accompanying drawings, which form a part hereof, show examples of the disclosure. It is to be understood that the examples shown in the drawings and/or discussed herein are non-exclusive and that there are other examples of how the disclosure may be practiced.

Reference is now made to FIG. 1A, which is a high-level schematic drawing of a special transformer 10 in an inverter 100 as described herein below. The inverter 100 may comprise first terminals 101, 103. First terminals 101, 103 may provide an input and be operative for receiving a direct current (DC) input. Alternatively, and as will be discussed below, first terminals 101, 103 may provide an output.

As will be described below, the DC input may be divided (which is will be described below) and then be input into a first inversion module 110 and a second inversion module 120. The first inversion module 110 and the second inversion module 120 may each comprise at least one switching circuit at the module input, such as first switching circuit 118 in the first inversion module 110, and second switching circuit 138 in the second inversion module 120. The first switching circuit 118 and the second switching circuit 138 may receive input DC current, and output a varying current. In typical cases, the varying current output may comprise alternating current (AC). Theoretically, the varying current output may comprise pulsating DC current (i.e., a periodic current which changes in value but does not changes direction). The varying current output by the first switching circuit 118 and the second switching circuit 138 may be then input into the special transformer 10, depicted in FIG. 1A as first primary winding 115 and first secondary winding 135 (in the first inversion module 110), second primary winding 125 and second secondary windings 145 (in the second inversion module 120), and common core 130. The common core 130 may comprise one or more ferromagnetic and/or ferromagnetic materials. In some cases, the transformer 10 may feature more primary windings than secondary windings, in which case, the input voltage to the transformer 10 will be lower than the voltage output by the transformer 10. Due to the nature of transformers, first primary winding 115 and first secondary winding 135 may be considered a first isolation stage, and second primary winding 125 and second secondary windings 145 may be considered a second isolation stage. The output of the transformer 10 may be input into first rectifier 155 in the first inversion module 110 and second rectifier 165 in the second inversion module 120. The first and second rectifiers 155, 165 may be passive rectifiers (e.g., diode bridges), or, alternatively, the first and second rectifiers 155, 165 may be active rectifiers (e.g. MOSFET or other switch bridges (i.e., an electronic circuit comprising two branches, typically parallel to one another connected by a third branch between the two branches). The first and second rectifiers 155, 165 may then output rectified DC current, which is input into third switching circuit 128 in the first inversion module 110 and fourth switching circuit 148 in the second inversion module 120. In typical operation, the first switching circuit 118 and the second switching circuit 138 are switched at a higher frequency than the third switching circuit 128 and the fourth switching circuit 148, thereby producing a low frequency ripple current. That is to say, the current output by the first switching circuit 118 and by the second switching circuit 138 typically has a higher ripple current frequency than the current output from the third switching circuit 128 and the fourth switching circuit 148. The third switching circuit 128 and the fourth switching circuit 148 may output AC current from the inverter 100 at second terminals 191, 193.

It is appreciated that, in principle, the inverter 100 may be operated such that the inverter 100 may receive an AC input at second terminals 191, 193. In such a case, the inverter operates as an AC/DC converter, delivering a DC output at the first terminals 101, 103.

The first inversion module 110 may comprise, at its input, the first switching circuit 118. The first switching circuit 118 may comprise an H-bridge that may switch a polarity of an input voltage. The first switching circuit 118 may, for example, be a pulse width modulation (PWM) operated switching circuit. The third switching circuit 128 may comprise an H-bridge. The third switching circuit 128 may, for example, be a PWM operated switching circuit. The PWM of the first switching circuit 118 is selected to yield an AC current output having a higher frequency than the AC current output which results from the operation of the PWM of the third switching circuit 128.

The second inversion module 120 may comprise, at its input, the second switching circuit 138. The second switching circuit 138 may comprise an H-bridge. The second switching circuit 138 may, for example, be a PWM operated switching circuit. The fourth switching circuit 148 may comprise an H-bridge. The fourth switching circuit 148 may, for example, be a PWM operated switching circuit. The PWM of the second switching circuit 138 and the PWM of the fourth switching circuit 148 are operated so that the AC current output from the second switching circuit 138 has a higher frequency than the AC current output from the fourth switching circuit 148.

In general, the first switching circuit 118 and the second switching circuit 138 may be implemented to produce a ripple current with any desired frequency. In some examples, a frequency of about 2 kHz is chosen in order to diminish switching loss, which may be caused by hard switching (i.e., forcing a switching element, such as a transistor to turn on and off by adding current or voltage to the switching element in order to enable changing states) of the first switching circuit 118 and the second switching circuit 138. It is appreciated that although either the first switching circuit 118 or the second switching circuit 138 may operate at between 1 Hz-10 MHz, nonetheless, in practice, the first switching circuit 118 or the second switching circuit 138 is more likely to be operated at a frequency between 16 KHz-200 KHz (frequencies at which switching losses are greatly reduced for IGBT and power FETs operating in a resonant circuit). In some implementations either one or both of the first switching circuit 118 or the second switching circuit 138 may operate at 30 KHz.

It is appreciated that either the third switching circuit 128 or the fourth switching circuit 148 may operate at between 1 Hz-10 MHz. By way of example, the third switching circuit 128 or the fourth switching circuit 148 may operate between 16 KHz-200 KHz, at a frequency of 2 kHz, or, between 1 Hz-10 MHz. In some implementations, all of either the first switching circuit 118, the second switching circuit 138, the third switching circuit 128, and the fourth switching circuit 148 may operate at 30 KHz. In some implementations, the first switching circuit 118 and the second switching circuit 138 may operate at or near 200 KHz and the third switching circuit 128, and the fourth switching circuit 148 may operate at 16 KHz. In alternative implementations, the first switching circuit 118 and the second switching circuit 138 may operate at or near 16 KHz and the third switching circuit 128, and the fourth switching circuit 148 may operate at 200 KHz.

The first rectifier 155 may be interposed between the output side of the first secondary winding 135 and an input to the third switching circuit 128. The second rectifier 165 may be interposed between the output side of the second secondary windings 145 and an input to the fourth switching circuit 148. The inverter 100 may comprise second terminals 191, 193 for outputting an AC output.

As briefly described above, the DC input received at the first terminals 101, 103, may be divided into a first DC sub-input and a second DC sub-input. The first DC sub-input may be input into the first inversion module 110 and the second DC sub-input may be input into the second inversion module 120. The first inversion module 110 may comprise the first primary winding 115 around a common core 130. The second inversion module 120 may comprise the second primary winding 125 around the common core 130. As shown in FIG. 1A, either one of or both of the first primary winding 115 and the second primary winding 125 may comprise a pair of inductors (each comprising a single set of windings) that are electrically connected in parallel. That is, either one of or both of the first primary winding 115 and the second primary winding 125 may comprise two sets of windings that are connected in parallel. Alternatively, either one of or both of the first primary winding 115 and the second primary winding 125 may comprise a single inductor (comprising a single set of windings). Still alternatively, either one of or both of the first primary winding 115 and the second primary winding 125 may comprise more than double (e.g., triple, quadruple, etc.) sets of windings. According to certain features and control methods, the frequency of a ripple current at the input of the first inversion module 110 may be higher than the frequency of a ripple current at the output of the first inversion module 110. Similarly, a ripple current at the input of the second inversion module 120 is of a higher frequency than a ripple current output of the second inversion module 120.

As will be discussed below, at least with reference to FIGS. 2A, 2B, and 3, either one of or both of the first primary winding 115 (wound around the common core 130) and the second primary winding 125 (wound around the common core 130) may comprise bifilar windings around the common core 130. More specifically, the first primary winding 115 and the second primary winding 125 may both comprise bifilar windings around a first leg of the common core. In some instances, either one of or both of the first primary winding 115 around the common core 130 and the second primary winding 125 around the common core 130 may comprise between 8 and 12 loops (or turns) of windings (inclusive) around the common core 130. In some instances, either or both of the first winding 115 and the second primary winding 125 may comprise dozens, or hundreds of sets of windings.

Although the first secondary winding 135 around the common core 130 and the second secondary windings 145 around the common core 130 are depicted as double sets of windings, it is appreciated that they may be a single set of windings. Alternatively, the first secondary winding 135 and the second secondary windings 145 may comprise more than double (e.g., triple, quadruple, etc.) windings. As will be discussed below, at least with reference to FIGS. 2A, 2B, and 3, either one of or both of the first secondary winding 135 and the second secondary windings 145 may comprise bifilar winding around the common core 130. More specifically, either one of or both of the first secondary winding 135 and the second secondary windings 145 may comprise bifilar windings around a second leg of the common core. In some instances, either or both of the first secondary winding 135 around the common core 130 and the second secondary windings 145 around the common core 130 may comprise between 8 and 12 loops (or turns) of windings (inclusive) around the common core 130. In some instances, either one of or both of the first secondary winding 135 and the second secondary windings 145 may comprise dozens, or hundreds of sets of windings. In some instances, the first secondary winding 135 and the second secondary windings 145 may have a similar number of windings compared to the first primary winding 115 and the second primary winding 125, and in some instances, the number of windings may be different. The common core 130 enables superposition of magnetic fluxes causes by current in different windings. Proper superposition (i.e., by appropriate switching algorithms and appropriate geometric windings patterns) causes reduction of high frequency magnetic fluxes in the core that translate to reduction of high frequency electrical currents in other windings around the core.

In cases where a number of turns of windings of primary and secondary windings are equal, then voltage will be the same across the primary and secondary windings. In general, a voltage on a secondary side (i.e., the side of the secondary windings) $V_{sec}=V_{prim}*N/M$, where $V_{prim}$ represents a voltage on a primary side (i.e., the side of the primary windings), M is the number of turns of windings on the primary side and N is the number of windings on the secondary side.

It is appreciated that appropriately sized first and second capacitors 132, 133, and appropriately sized third capacitor 131 at the inputs to the first inversion module 110 and the second inversion module 120, stabilize voltage to be input into the first switching circuit 118 and the second switching circuit 138. The third capacitor 131 may be sized as much as or more than ten times more than the first and second capacitors 132, 133. For example, each of first and second capacitors 132, 133 may have a capacitance of about 5 uF-20 uF, and third capacitor 131 may have a capacitance of about 100 uF or 200 uF. More specifically, the third capacitor 131 may serve as a provider of power to the inverter 100. As was noted above, the DC input received at the first terminals 101, 103, may be divided into a first DC sub-input and a second DC sub-input. The first DC sub-input may be input into the first inversion module 110 and the second DC sub-input may be input into the second inversion module 120. The first and second capacitors 132, 133 may receive the power from the third capacitor 131 and, with the transformer 10, ensure that the first DC sub-input and the second DC sub-input are substantially the same. Appropriately sized fourth and fifth capacitors 171, 172 stabilize voltage at the inputs to third switching circuit 128 and fourth switching circuit 148, as well as contribute to reducing ripple currents in the inverter 100.

Figure 1B:
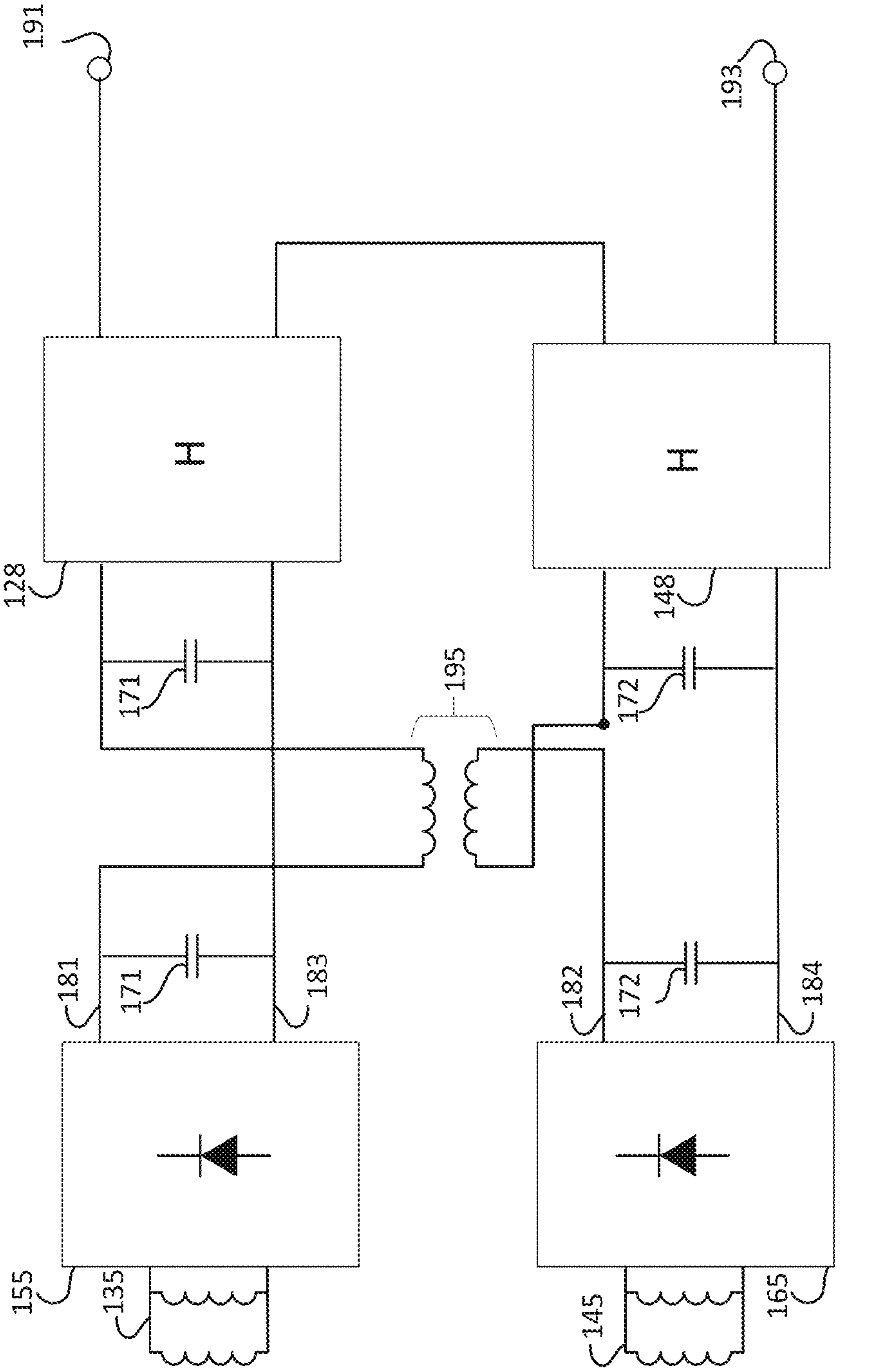
FIG. 1B shows a detail of the drawing of the special transformer in the inverter of FIG. 1A.

Reference is now briefly made to FIG. 1B which shows a detail of the drawing of the inverter of FIG. 1A. It may be the case that current flowing through the third switching circuit 128 is out of phase with the current flowing through the fourth switching circuit 148, due to phase-shifted operation of third switching circuit 128 with respect to the fourth switching circuit 148. For example, the third switching circuit 128 may be switched at a phase difference of about 180 degrees with respect to switching circuit 148. In order to compensate and adapt the two currents to one another, as well as to synchronize the current flowing through the third switching circuit 128 with the current flowing through the fourth switching circuit 148, a differential mode choke 195 may be placed between output 181 of the first rectifier 155 and the output 182 of the second rectifier 165. In such a case, appropriately sized (by way of example, between 4 to 100 μFarads) fourth and fifth capacitors 171, 172 may be disposed on both the input and output sides of the differential mode choke 195, in order to further reduce ripple currents. Alternatively or additionally, a common mode choke may be placed between output 183 of the first rectifier 155 and output 184 of the second rectifier 165. For case of depiction, the differential mode choke 195 appears only in FIG. 1B. Additionally, the common mode choke is not depicted.

Returning to the discussion of FIG. 1A, the inverter 100 as described herein above is described as having two inversion modules, i.e., first inversion module 110 and a second inversion module 120. However, in other examples, a third inversion module, a fourth inversion module, etc. may be added. In these cases, additional windings may be added. For instance, if the inverter 100 has three inversion modules, then the primary windings and the secondary windings as described above as being bifilar windings, may instead comprise trifilar windings. Further, if the inverter 100 has four inversion modules, then the primary windings and the secondary windings may comprise quadrifilar windings, and so forth, wherein an additional n-filar winding may be added for each additional inversion module. In some instances, instead of bifilar windings, two separate parallel windings may be used. Similarly, three or four parallel windings may be used instead of trifilar or quadrifilar windings, respectively.

Figure 1C:
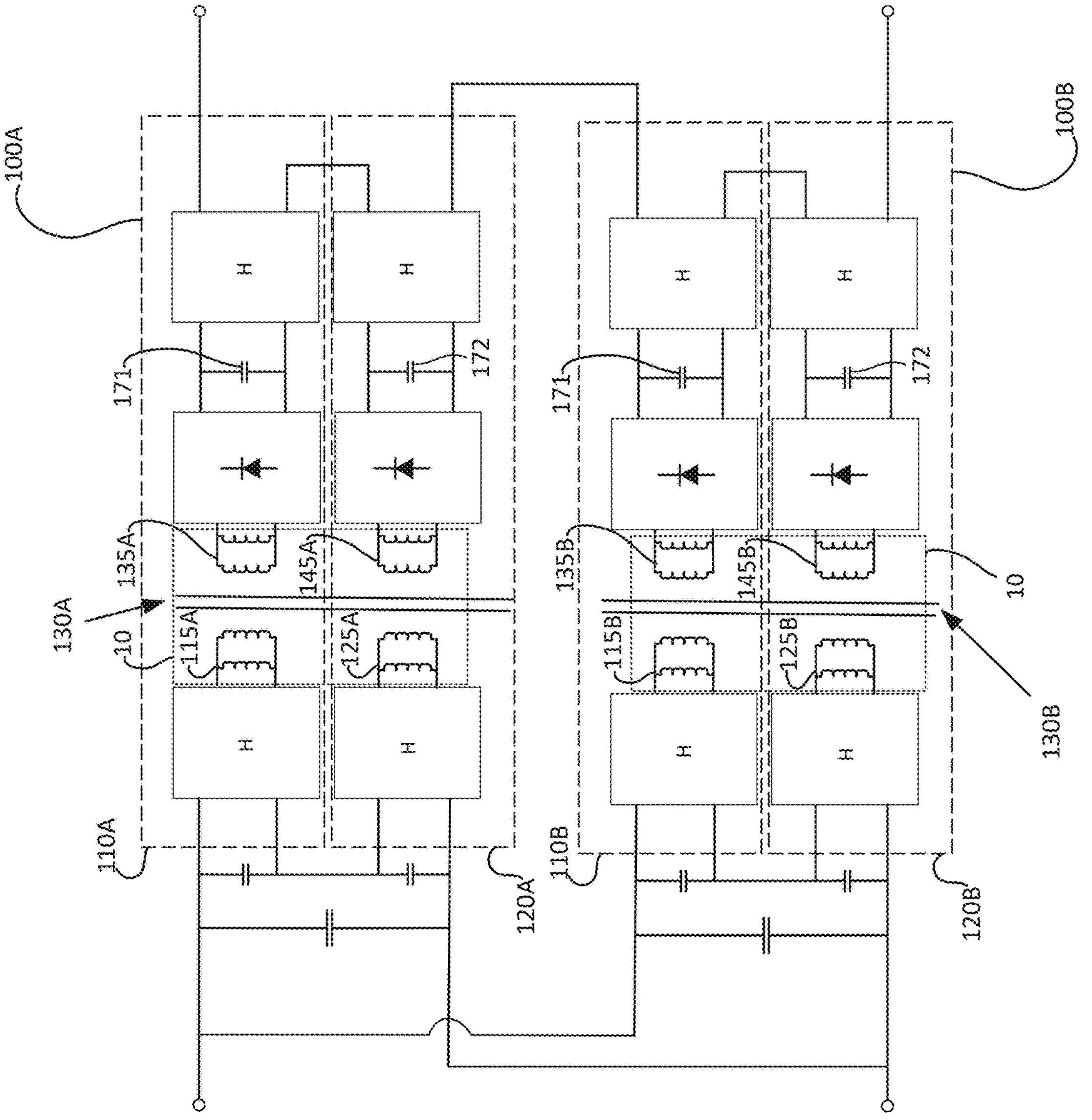
FIG. 1C shows a cascading configuration of a plurality of inverters comprising the special transformer of FIG. 1A.

Reference is now made to FIG. 1C, which shows a cascading configuration of a plurality of inverters comprising the special transformer 10 of FIG. 1A in an inverter. Two inverters 100 (depicted as inverter 100A and inverter 100B) are shown connected in series at their input and in parallel at their output. In the cascading configuration of a plurality of inverters depicted in FIG. 1C, there are two of first inversion module 110 (depicted as first inversion module 110A and first inversion module 110B), and two of second inversion module 120 (depicted as second inversion module 120A and second inversion module 120B). Cascading the inverters 100A and 100B in this fashion enables achieving a higher output voltage than the output voltage from a single inverter 100 (as depicted in FIG. 1A). First inversion module 110A and second inversion module 120A form a first inversion cell and share a common core 130A, around which first primary winding 115A and first secondary winding 135A are wound in a bifilar manner, so that the first primary winding 115A and first secondary winding 135A are wound together around common core 130A. Second primary winding 125A and second secondary winding 145A are wound in a bifilar manner, so that the second primary winding 125A and second secondary winding 145A are wound together around common core 130A. Third inversion module 110B and fourth inversion module 120B form a second inversion cell and share a common core 130B, around which third primary winding 115B and third secondary winding 135B are wound in a bifilar manner, so that the third primary winding 115B and third secondary winding 135B are wound together around common core 130B. Fourth primary winding 125B and fourth secondary winding 145B are wound in a bifilar manner, so that the fourth primary winding 125B and fourth secondary winding 145B are wound together around common core 130B.

In the case shown in FIG. 1C, switching circuits associated with the four inversion modules 110A, 120A, 110B and 120B may be operated at a phase shift of about 90 degrees (360/4 degrees) with respect to one another, which may create current and/or voltage ripples reflected towards inputs of the inversion modules by virtue of electrical and magnetic connections between input and output and Kirchhoff's laws. That is to say, high frequency current at the output of inversion modules 110A and 110B comes from the third switching circuit 128 and/or the fourth switching circuit 148, which in turn comes from capacitor 171 and capacitor 172 and/or the first rectifier 155 and the second rectifier 165. The transformer 10 winding and filtering techniques disclosed herein may reduce negative effects of the ripples and may prevent damage to components of the inversion modules or electronics connected to the inversion modules.

Figure 1D:
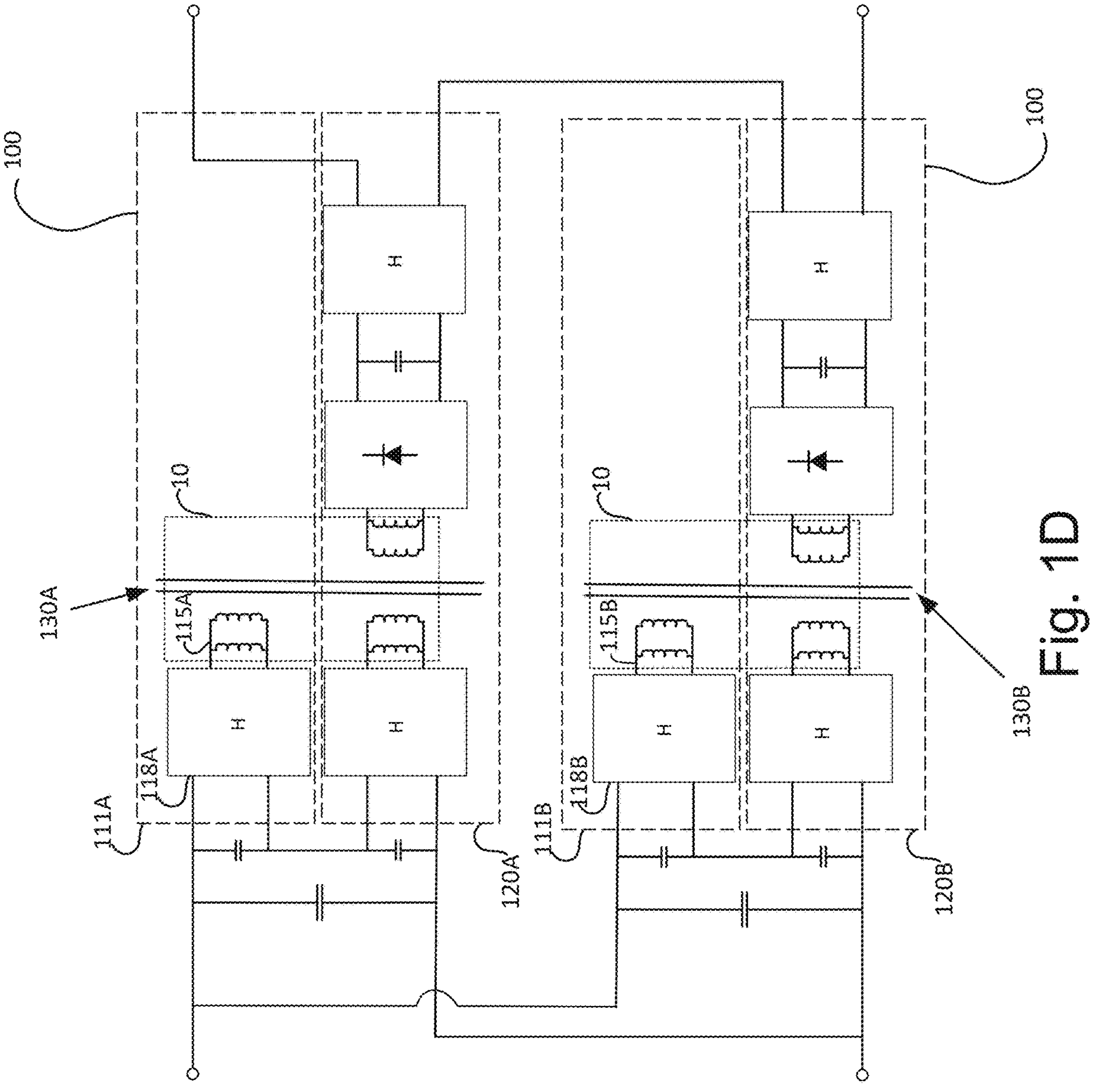
FIG. 1D shows an alternative configuration of the plurality of inverters comprising the special transformer of FIG. 1A.

Reference is now made to FIG. 1D, which shows an alternative configuration of the plurality of inverters comprising the special transformer 10 of FIG. 1A. In the embodiment depicted in FIG. 1D, first inversion module 110A of FIG. 1C has been replaced with a first switching circuit module 111A having the switching circuit 118A and the first primary winding 115A. Similarly, first inversion module 110B of FIG. 1C has been replaced with a second switching circuit module 111B having the switching circuit 118B and the second primary winding 115B. As opposed to the embodiment of the first inversion module 110B of FIG. 1C (and corresponding first inversion module 110A of FIG. 1A), the switching circuit module 111A does not have the first secondary winding 135, the first rectifier 155, the capacitor 171 and the third switching circuit 128 of FIG. 1A. However, first switching circuit module 111A and second inversion module 120A form an inversion cell with a shared core 130A. Similarly, second switching circuit module 111B and second inversion module 120B form an inversion cell with a shared core 130B.

In some embodiments, there may be many more primary windings than secondary windings (such as in FIG. 1D). In various alternative embodiments, the number of modules may be changed so that there are, by example, one primary winding to one secondary winding; one primary winding to two secondary windings; two primary windings to one secondary winding; two primary windings to two secondary windings; two primary windings to four secondary windings; four primary windings to two secondary windings; and so forth. It is appreciated that in some of these cases, an increase in the number of windings may be due to different windings being wound in a bifilar (trifilar, quadrifilar, . . . , n-filar) manner, so that in an embodiment where there are four primary windings to two secondary windings, the four primary windings are wound in a quadrifilar manner and connected in parallel, whiles the two secondary windings are wound in a bifilar manner and connected in parallel. The windings, as discussed throughout this disclosure are around common core 130.

Figure 2A:
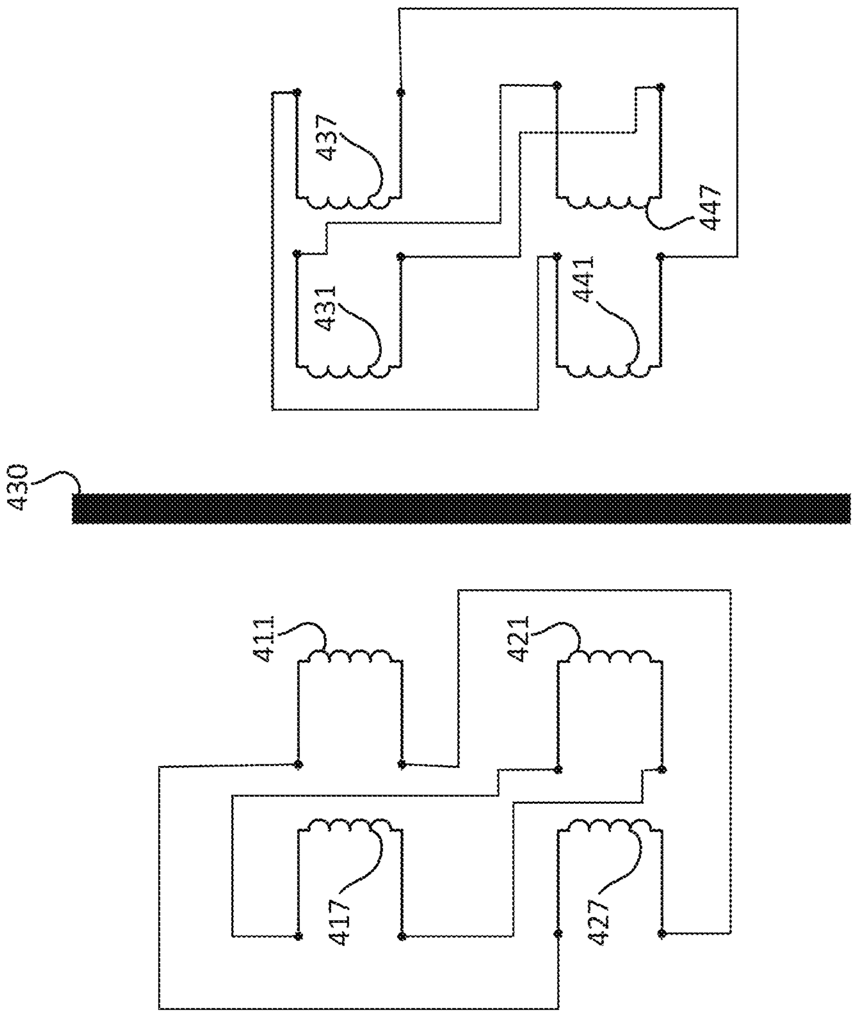
FIG. 2A shows a schematic configuration of a common core and windings.

Reference is now made to FIG. 2A, which shows a schematic configuration of a common core 430 and windings that may be used in windings of FIGS. 1A-1D. As was noted above, with reference to the discussion of FIG. 1A, the windings around the common core 430 may comprise bifilar windings (i.e., a first winding which is wound internally to a second winding—as will be shown below, with reference to FIG. 4). The common core 430, may generally be the same as or similar to common cores 130, 130A, and 130B, respectively of FIG. 1A-1D. A first primary winding 411 may be disposed on a first portion (e.g., an upper portion) of the common core 430. A second primary winding 427 may be disposed on a second (e.g., a lower portion) of the common core 430, and connected electrically parallel to the first primary winding 411. The first portion may be any portion, of the common core 430, that is different from the second portion. A third primary winding 417 may be disposed on the first portion of the common core 430, in a bifilar fashion with respect to first primary winding 411. A fourth primary winding 421 may be disposed on the second portion of the common core 430 in a bifilar fashion with third primary winding 427, and connected in parallel to the third primary winding 417. It is appreciated that with reference to FIG. 1A, first primary winding 411 and/or second primary winding 427 may be the same or similar to first primary winding 115 and second primary winding 125 of FIG. 1A. Likewise, third primary winding 417 and fourth primary winding 421 may be the same or similar to another one of first primary winding 115 and second primary winding 125.

A first secondary winding 431 may be disposed on the first portion of the common core 430. A second secondary winding 447 may be disposed on the second portion of the common core 430, and connected in parallel to the first secondary winding 431A third secondary winding 441 may be disposed on the second portion of the common core 430. A fourth secondary winding 437 may be disposed on the first portion of the common core 430, and connected in parallel to the third secondary winding 441. The above description of FIG. 2A is meant to illustrate one possible configuration for winding the various windings around the common core 430. FIG. 2A is not meant to limit nor to exclude other appropriate configurations or systems of windings. It is appreciated that with reference to FIG. 1A, first secondary winding 431 and/or second secondary winding 447 may be the same or similar to first secondary winding 135 and second secondary winding 145 of FIG. 1A. Likewise, third secondary winding 437 and fourth secondary winding 441 may be the same or similar to another one of first secondary winding 135 and second secondary winding 145.

It is appreciated that, with reference to trifilar (i.e., three windings around the common core), quadrifilar (i.e., four windings around the common core), and n-filar windings, as mentioned above in the description of FIG. 1A, the additional windings may also be connected in parallel.

Figure 2B:
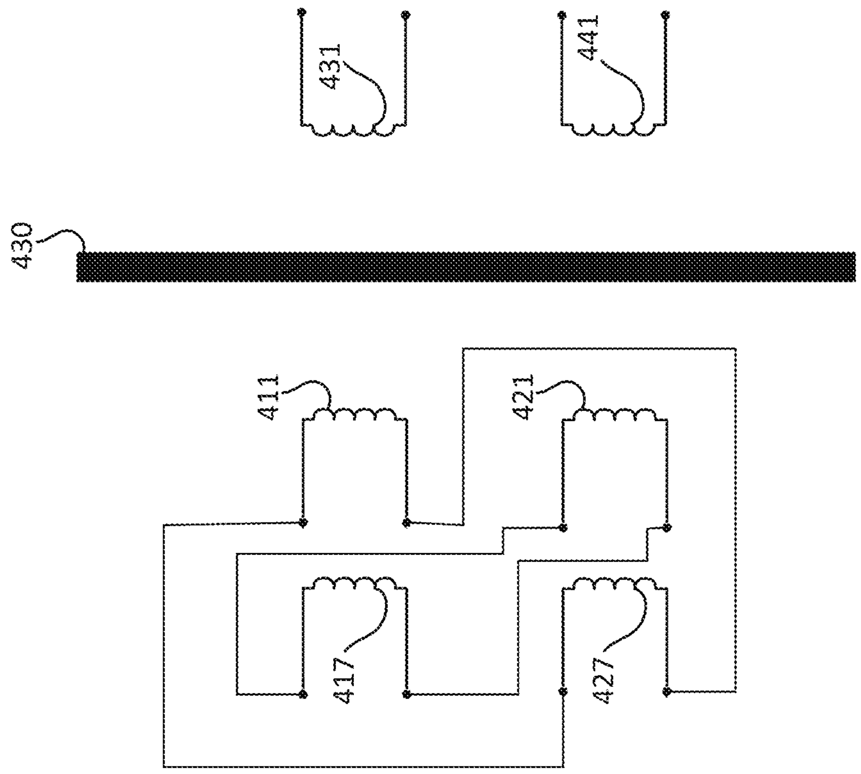
FIG. 2B shows a detail of an alternative schematic configuration of the common core and windings.

Reference is now made to FIG. 2B, which shows a detail of an alternative configuration of the common core and windings. As was noted above with reference to the discussion of FIG. 1D, in some embodiments, there may be differing numbers of primary and secondary windings. As noted above, FIG. 2A depicts an embodiment where there are four primary windings (i.e., first primary winding 411; second primary winding 427; third primary winding 417; and fourth primary winding 421) and four secondary windings (i.e., first secondary winding 431; second secondary winding 447; third secondary winding 441; and fourth secondary winding 437). FIG. 2B, by contrast, depicts an example of one alternative embodiment described above (in the discussion of FIG. 1D). All of the primary windings mentioned in the description of FIG. 2A are present in this embodiment (i.e., first primary winding 411; second primary winding 427; third primary winding 417; and fourth primary winding 421). However, only two of the secondary windings, first secondary winding 431 and third secondary winding 441 are present in the depicted embodiment. As has been noted, FIG. 2B is of one alternative embodiment, and other embodiments (such as, and without limiting the generality of the foregoing, the embodiments mentioned in the discussion of FIG. 1D) have already been described herein.

Figure 2C:
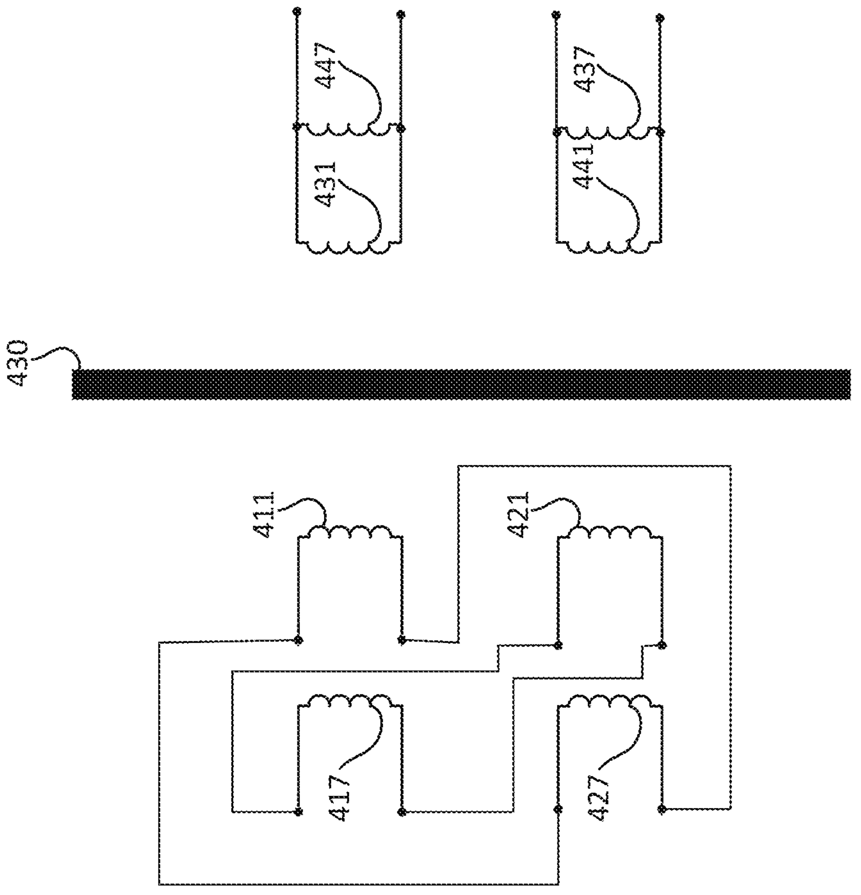
FIG. 2C shows a detail of a second alternative schematic configuration of the common core and windings.

Reference is now made to FIG. 2C, which shows a detail of a second alternative schematic configuration of the common core and windings. In FIG. 2C, as in FIG. 2B, the primary windings mentioned in the description of FIG. 2A are present in this embodiment (i.e., first primary winding 411; second primary winding 427; third primary winding 417; and fourth primary winding 421), in the configuration as described above with reference to FIG. 2A. All four of the secondary windings (i.e., first secondary winding 431, second secondary winding 447, third secondary winding 441, and fourth secondary winding 437) are present in the depicted embodiment, as opposed to the configuration presented in FIG. 2B. However, rather than being configured as in FIG. 2A, the secondary windings are connected in parallel with the bifilar winding on the same part of the core on which it itself is disposed. I.e., both first secondary winding 431 and second secondary winding 447 are wound in a bifilar fashion around the same portion of the same leg of the core. Similarly, first secondary winding 431, second secondary winding 447 and fourth secondary winding 437 are wound in a bifilar fashion around the same leg of the core.

Figure 2D:
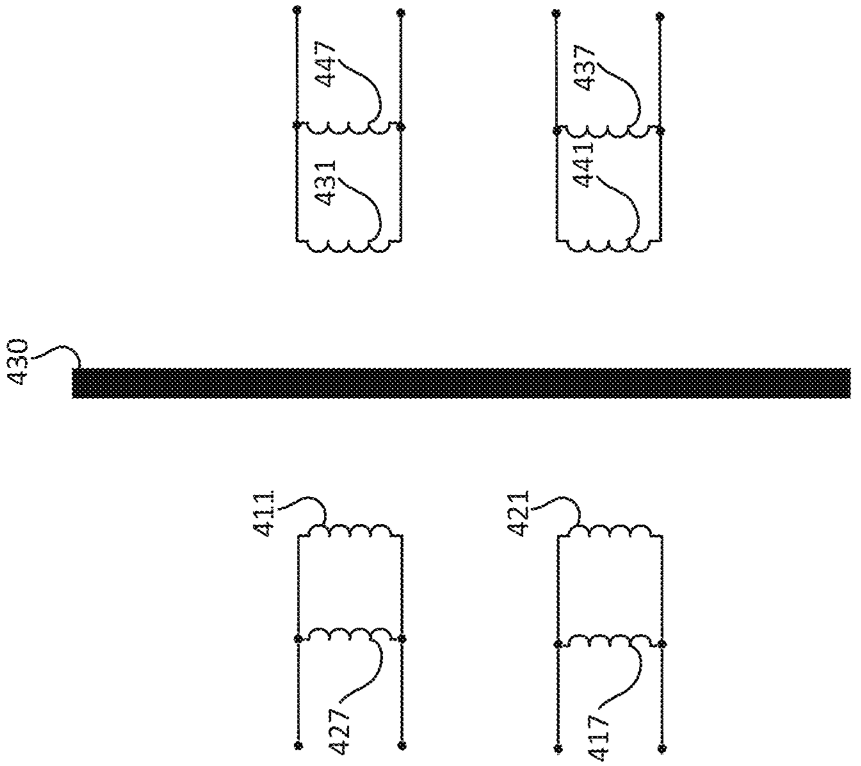
FIG. 2D shows a detail of a third alternative schematic configuration of the common core and windings.

Reference is now made to FIG. 2D, which shows a detail of a third alternative schematic configuration of the common core and windings. In the depiction of FIG. 2D, all four of the bifilar primary windings and bifilar secondary windings are connected in parallel to the same winding sharing the same portion of the same leg of the core. Specifically, first primary winding 411 and second primary winding 427 are connected in parallel and share the same portion of the same leg of the core. Third primary winding 417 and fourth primary winding 421 are connected in parallel and share the same portion of the same leg of the core. Similar to FIG. 2C, first secondary winding 431 and second secondary winding 447 are wound in a bifilar fashion around the same portion of the same leg of the core. Similarly, first secondary winding 431, second secondary winding 447 and fourth secondary winding 437 are wound in a bifilar fashion around the same leg of the core.

Figure 3:
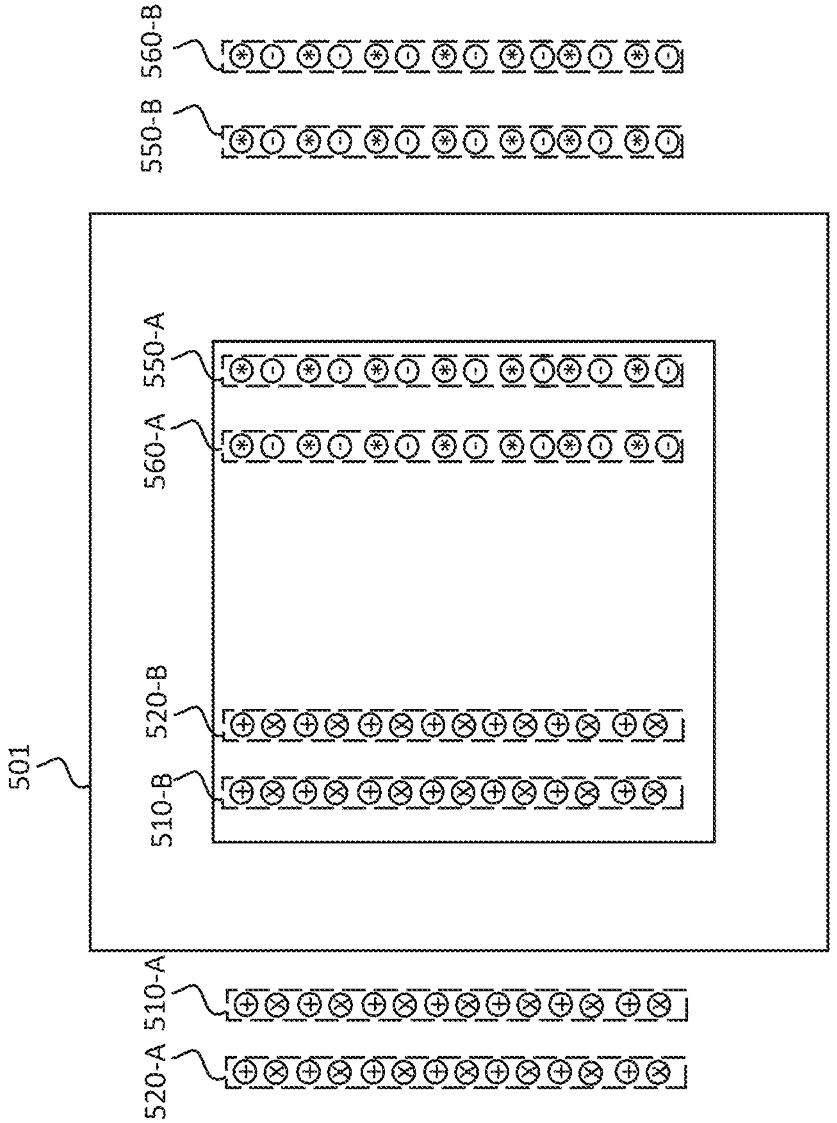
FIG. 3 shows a sectional view of the common core and windings.

Reference is now made to FIG. 3, which shows a sectional view of the common core 501 and windings. Continuing with the discussion of the various windings around the common core 430, above, with reference to FIG. 2A, another view is presented here, with reference to FIG. 3. First primary winding 510-A and 510-B, on the inside of the left leg of the common core 501, is shown wound around the common core 510 in a bifilar fashion. The bifilar fashion is illustrated by a first set of windings indicated by +s, and a second set of windings, interleaved with the first set of windings, indicated by Xs. Secondary winding 520-A and 520-B are shown overlaid over the primary winding, and are also shown as bifilar windings. Rather than symbols such as a dot (•) and an X, which are conventionally used to denote direction of current flow, +s and Xs are used to indicate contrast between a first loop and a second loop in bifilar pair of a primary or secondary winding. A second set of bifilar windings, comprising second primary winding 550-A and 550-B and second secondary winding 560-A and 560-B is shown on the right leg of common core 501. By distinction from first primary winding 510-A and 510-B and first secondary winding 520-A and 520-B, second primary winding 550-A and 550-B and second secondary winding 560-A and 560-B are indicated with asterisks (*) and dashes (-).

Figure 4:
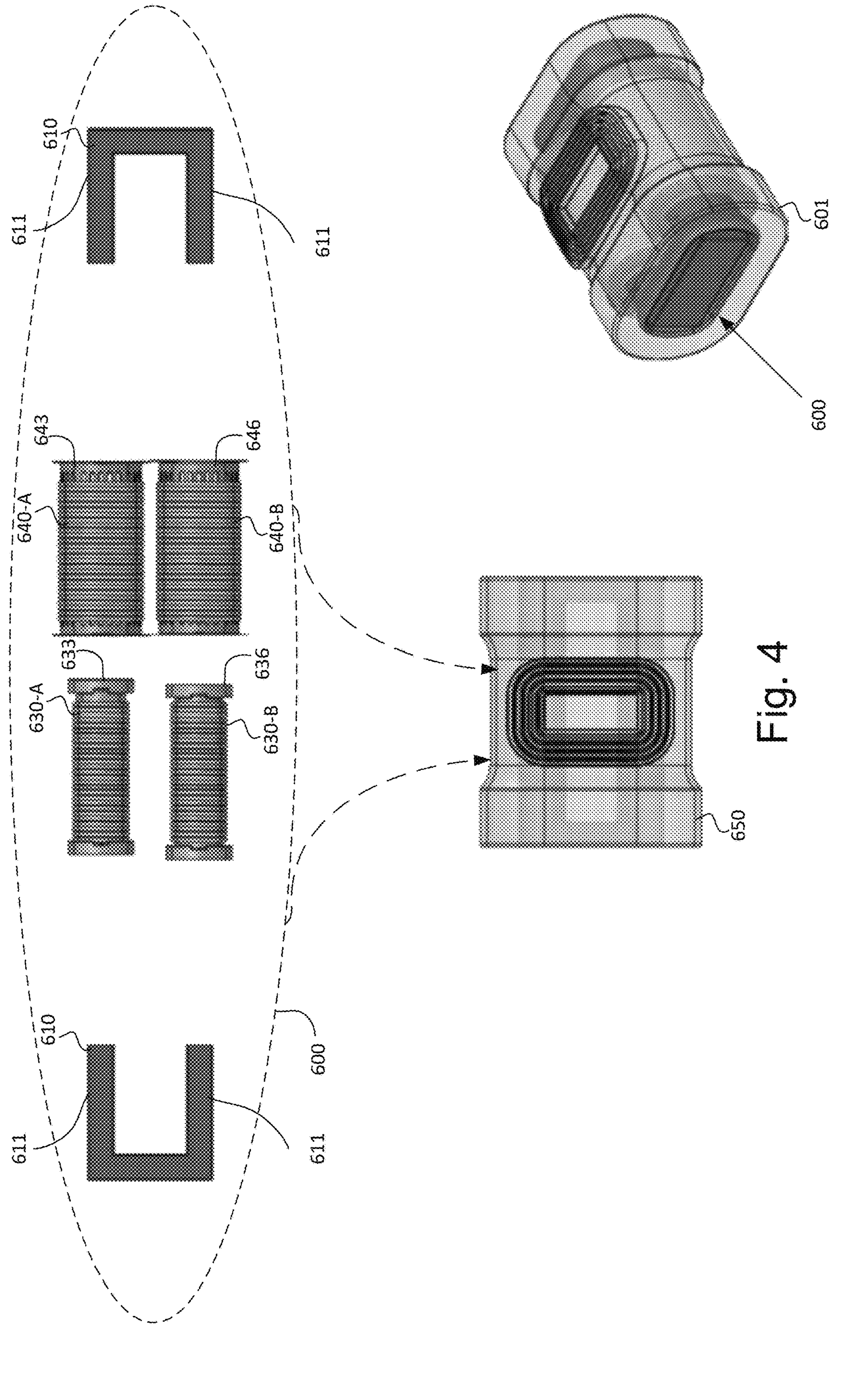
FIG. 4 shows an example of an exploded view and assembled views of apparatus with bifilar windings around the common core.

Reference is now made to FIG. 4, which shows an example of an exploded view and an example of assembled views of a transformer apparatus 600 with bifilar windings around the common core, such as may be used for the windings described herein. The core 610 may generally be the same or similar to common cores 130, 130A, 130B, 430, or 501. A semi-conductive material may be used to provide a base which holds bobbins for the windings (to be described below), such as the primary windings 510 and 520 of FIG. 3, as well as the secondary windings 550 and 560 described hereinabove. First internal winding 630-A may sit on a first bobbin 633. Second internal winding 630-B sits on a second bobbin 636. First external winding 640-A may sit on a third bobbin 643 over and around first internal winding 630-A on the first bobbin 633. Second external winding 640-B may sit on a fourth bobbin 646 over and around the second internal winding 630-B on the second bobbin 636. The first bobbin 633, the second bobbin 636, the third bobbin 643 and the fourth bobbin 646 may be formed of an appropriate material, having electromagnetic properties such as to not interfere with operation of the transformer apparatus 600. In an implementation, the first bobbin 633 together with the first internal winding 630-A may be inserted in a hollow portion of the third bobbin 643; and one of legs 611 of the core 610 may be inserted into a hollow portion of the first bobbin 633.

First internal winding 630-A may be a primary winding corresponding to first primary winding 115 of FIG. 1A, and first external winding 640-A may be a secondary winding corresponding to first secondary winding 135 of FIG. 1A. According to some implementations, first internal winding 630-A may correspond to first secondary winding 135 and first external winding 640-A may correspond to first primary winding 115.

Figure 5:
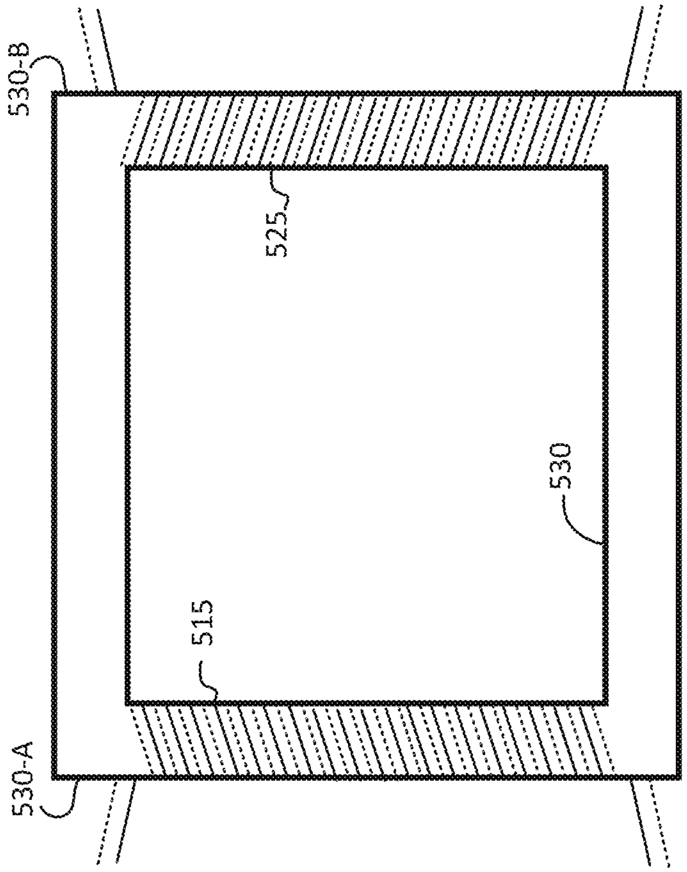
FIG. 5 shows an example of a common core that may be implemented in FIG. 4.

Each of first internal winding 630-A, first external winding 640-A, second internal winding 630-B, second external winding 640-B may comprise a bifilar pair as depicted in FIG. 5, or may be a single wire. FIG. 5 shows a common core 530 having a first leg 530-A and a second leg 530-B. A first bifilar winding 515, depicted as alternating dashed and continuous line segments (in order to show the bifilar nature of the winding) is wound around the first leg 530-A. A second bifilar winding 525, depicted as alternating dashed and continuous line segments (in order to show the bifilar nature of the winding) is wound around the first leg 530-B. The first and second bifilar windings 515 and 525 may correspond to primary windings 115 and 125 of FIG. 1A, respectively; and two sets secondary windings (not explicitly drawn in FIG. 5, for clarity) may be wound in a similar manner and be wound over (e.g., on top of, and separated by insulating material) bifilar windings 515 and 525.

A cover 650 may be placed over the transformer apparatus 600, and the covered transformer apparatus may be such as depicted by covered transformer apparatus 601. The cover may be formed of an appropriate material, having electromagnetic properties such as to not interfere with operation of the transformer apparatus 600.

When the various windings described above, for example, with reference to FIGS. 2A-2D, have a "cross connection" (as in the primary windings and secondary windings of FIG. 2A, and the primary windings of FIGS. 2B and 2C), then the two windings that are electrically parallel are physically wound on separate limbs/legs (i.e., 630A and 630B are separate limbs, 640A and 640B are separate limbs). When the various windings described above, for example, with reference to FIGS. 2A-2D, do not have a cross connection, as in the secondary windings of FIG. 2C, and the primary windings and secondary windings of FIG. 2D, then two electrically-parallel windings are on the same limb.

The following table summarizes the above discussion, relating the physical structure of the inverted described in FIG. 4 with the electrical connections of the windings described above with reference to FIGS. 2A-2D:

| | Primary cross connection | Secondary cross connection | Relationship to FIG. 4 | | | | FIG. with similar result |
|---|---|---|---|---|---|---|---|
| | | | 630A | 630B | 640A | 640B | |
| FIG. 2A | Yes | Yes | 411, 417 | 427, 421 | 431, 437 | 441, 447 | N/A |
| FIG. 2B | Yes | N/A (no bifilar) | 411, 417 | 427, 421 | 431 | 441 | N/A |
| FIG. 2C | Yes | No | 411, 417 | 427, 421 | 431, 447 | 441, 437 | 7, 10 |
| FIG. 2D | No | No | 411, 427 | 417, 421 | 431, 447 | 441, 437 | 6, 8, 9 |

The numbers in the above table under "Relationship to FIG. 4" relate internal windings 630A and 630B, external windings 640A and 640B to specific corresponding primary and secondary windings in the various winding configurations depicted in FIGS. 2A-2D.

In some cases, when operating an inverter in medium voltage range (e.g., 2 kV-35 kV), there may be a risk of a voltage discharge from a medium voltage section of the inverter to a low voltage section (e.g., up to 1 kV) of the inverter. Such a risk rises as a voltage difference becomes larger between the medium voltage section of the inverter to a low voltage section of the inverter. A potential for damage caused by such a discharge may correspondingly increase as the risk of the voltage discharge increases. It may be desirable, in such instances to discharge electrical energy to ground. Potentially, the discharge of electrical energy to ground may be effected by the medium voltage section of the inverter or by the low voltage section of the inverter. An additional stage may be added to the inverter whereby an additional transformer is present, and electrical energy may be discharged to ground from this additional transformer. A circuit may be implemented (e.g., by the use of switches, such as silicon controlled rectifiers) between legs of the low voltage transformer which will disconnect the medium voltage section of the inverter from an electrical power grid for a short amount of time, during which excess voltage may be discharged to ground.

Reference is now made in general to FIGS. 6-10. FIGS. 6-10 are plots of simulations of ripple currents over time in primary and secondary windings of a circuit comprising an inverter, such as the inverter described above with reference to FIG. 1A.

Each of FIGS. 6-10 has two plots: an upper plot and a lower plot. The upper plot is a plot of a current measured on the primary side of the transformer of inverter 100 of FIG. 1A with some, all, or none of the features described herein above, as will be described below. The lower plot is a plot of a current measured on the secondary side of the transformer of inverter 100 of FIG. 1A with some, all, or none of the features described herein above, as will be described below.

Each of the plots shows a high frequency ripple and a low frequency ripple. The high frequency ripple is caused by high frequency switching at (in these example simulations) the first switching circuit 118 and the second switching circuit 138. The low frequency ripple is caused by low frequency switching at (in these example simulations) the third switching circuit 128 and the fourth switching circuit 148.

Because the primary and secondary transformer windings (i.e., the various windings described above) are magnetically linked via the transformer, the high frequency ripple and the low frequency ripple are both present in both the primary and secondary currents, and thus, the low frequency ripple can be detected when viewing an envelope of a current measured at the input or output. Similarly, the high frequency ripple can be detected when viewing the internal periodic current measured in each cycle of the envelope of a current measured at the output or the input. The amplitude of a measured current includes a superposition of the high frequency ripple and the low frequency ripple.

The plots in FIGS. 6-10 of the primary currents (i.e., the "upper" plots) are based on measurements of current between the first switching circuit 118 and the first primary winding 115 in the first inversion module 110 and the second switching circuit 138 and the second primary winding 125 in the second inversion module 120. The plots in FIGS. 6-10 of the secondary current (i.e., the "lower" plots) are based on measurements of current between the first secondary winding 135 and the first rectifier 155 in the first inversion module 110 and the second secondary winding 145 and the second rectifiers 165 in the second inversion module 120.

Figure 6:
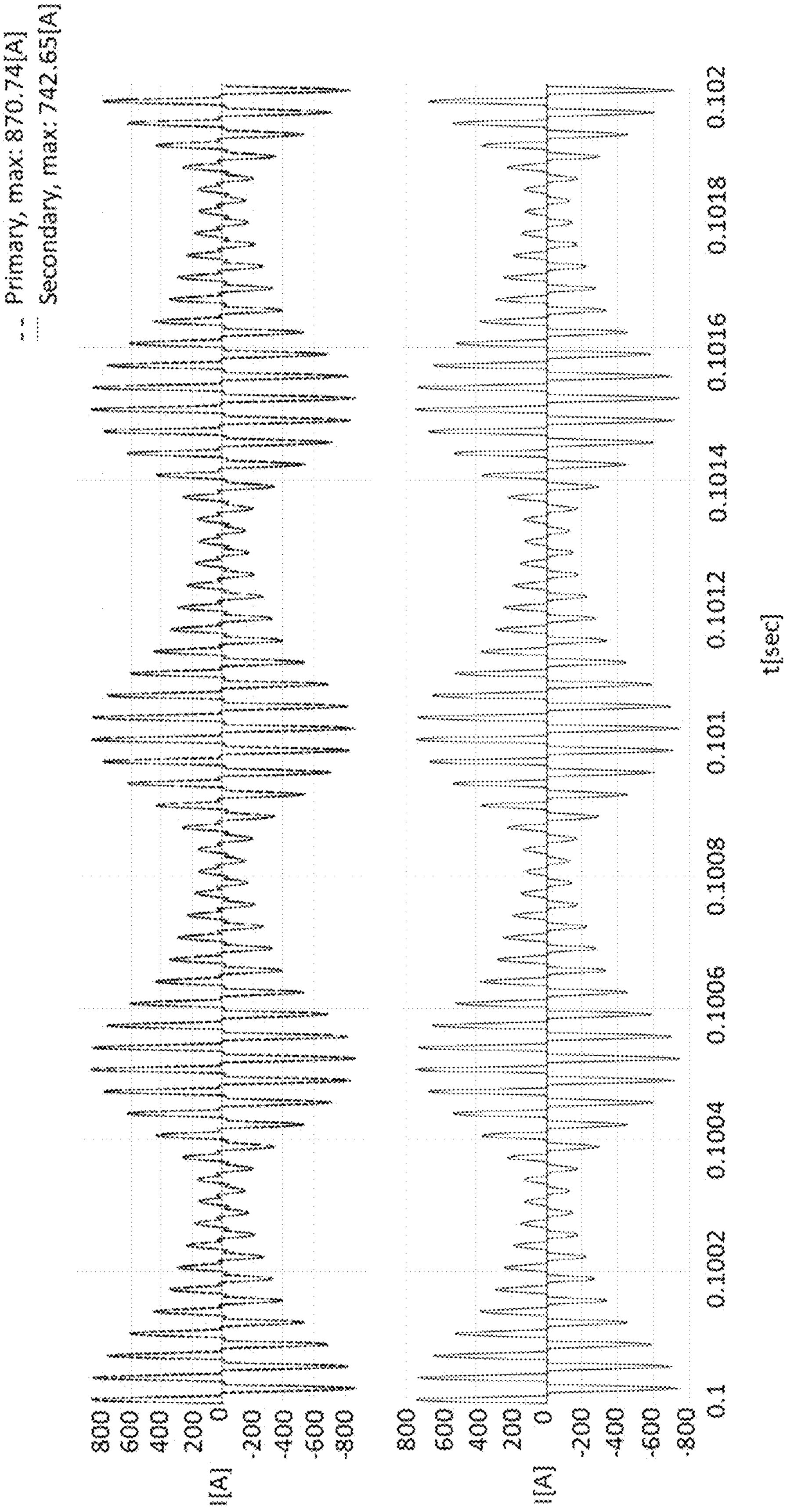
FIG. 6 is a first plot of a simulation of current measurable over time in the inverter described above according to features/parts of the disclosure herein.

FIG. 6 is a plot of a simulation of current measured over time in the inverter described above in the absence of transformer cross connection (i.e., where the primary and secondary windings are wound as shown in FIG. 2D) and the differential mode choke. Capacitors 132, 133 may have a substantially lower (for example, up to 20 times lower) capacitance than in other examples, below. The ripple current at the primary windings have a maximum of 870.74[A]. The ripple current at the secondary windings have a maximum of 742.65[A].

Figure 7:
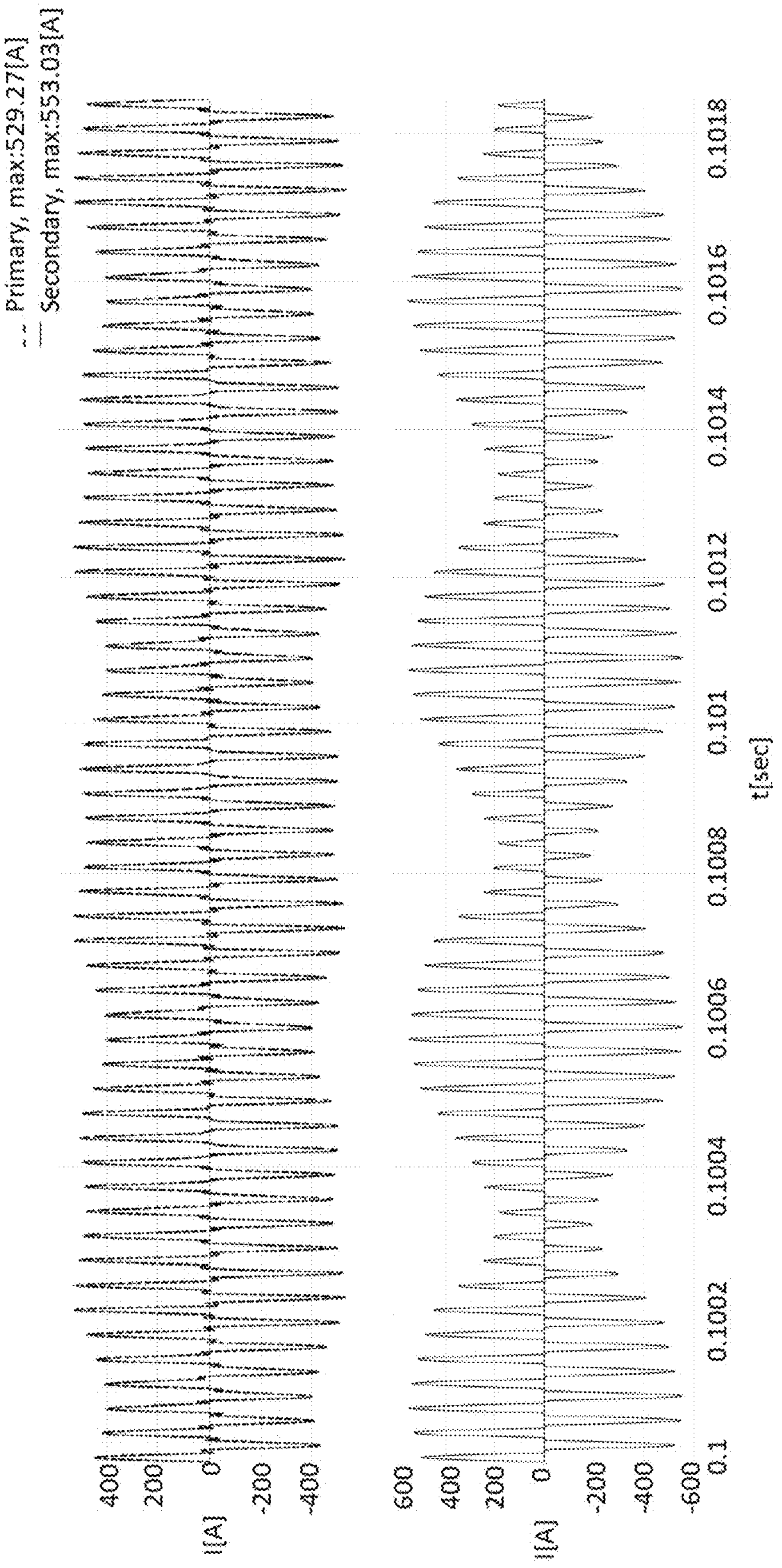
FIG. 7 is a second plot of a simulation of current output over time in the inverter described above according to features/parts of the disclosure herein.

FIG. 7 is a plot of a simulation of current measured over time in the inverter described above having the transformer cross connection at the input of the transformer. There is no differential mode choke and the capacitors 132, 133 may have a substantially lower (for example, up to 20 times lower) capacitance than in other examples. The ripple current at the primary windings have a maximum of 529.27[A]. The ripple current at the secondary windings have a maximum of 553.03[A]. These values are noticeably lower than the corresponding values shown in FIG. 6, indicating that cross-connecting the winding on the primary side of the transformer may reduce current ripple, potentially reducing losses and increasing efficiency.

Figure 8:
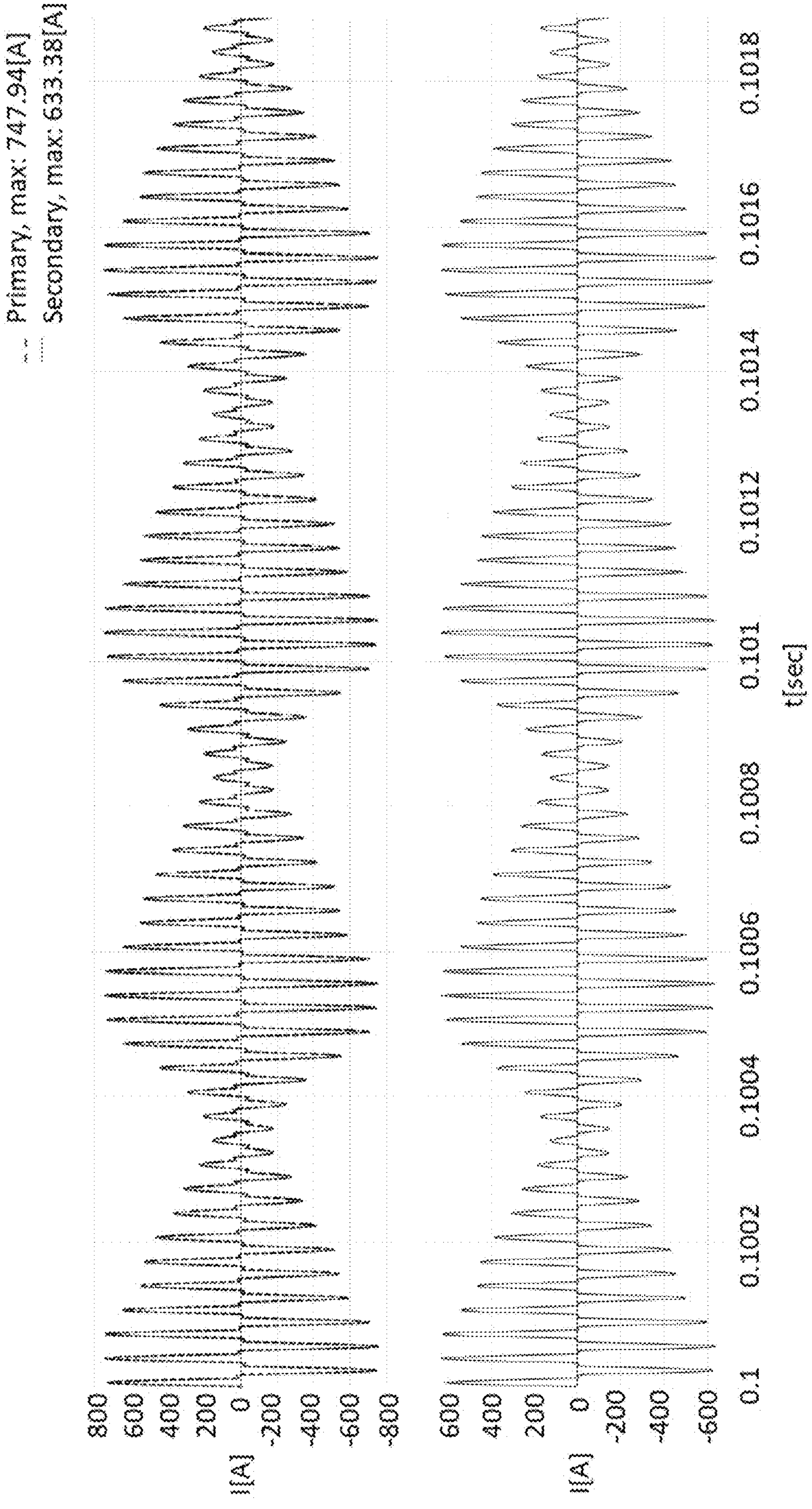
FIG. 8 is a third plot of a simulation of current output over time in the inverter described above according to features/parts of the disclosure herein.

FIG. 8 is a plot of a simulation of current measured over time in the inverter described above where the capacitors in the inverter have a substantially higher capacitance (by contrast to the example in FIG. 6, nearly 20 times higher than in other examples). There is no differential mode choke, and no cross connection of the windings. The ripple current at the primary windings have a maximum of 747.94[A]. The ripple current at the secondary windings have a maximum of 633.38[A].

Figure 9:
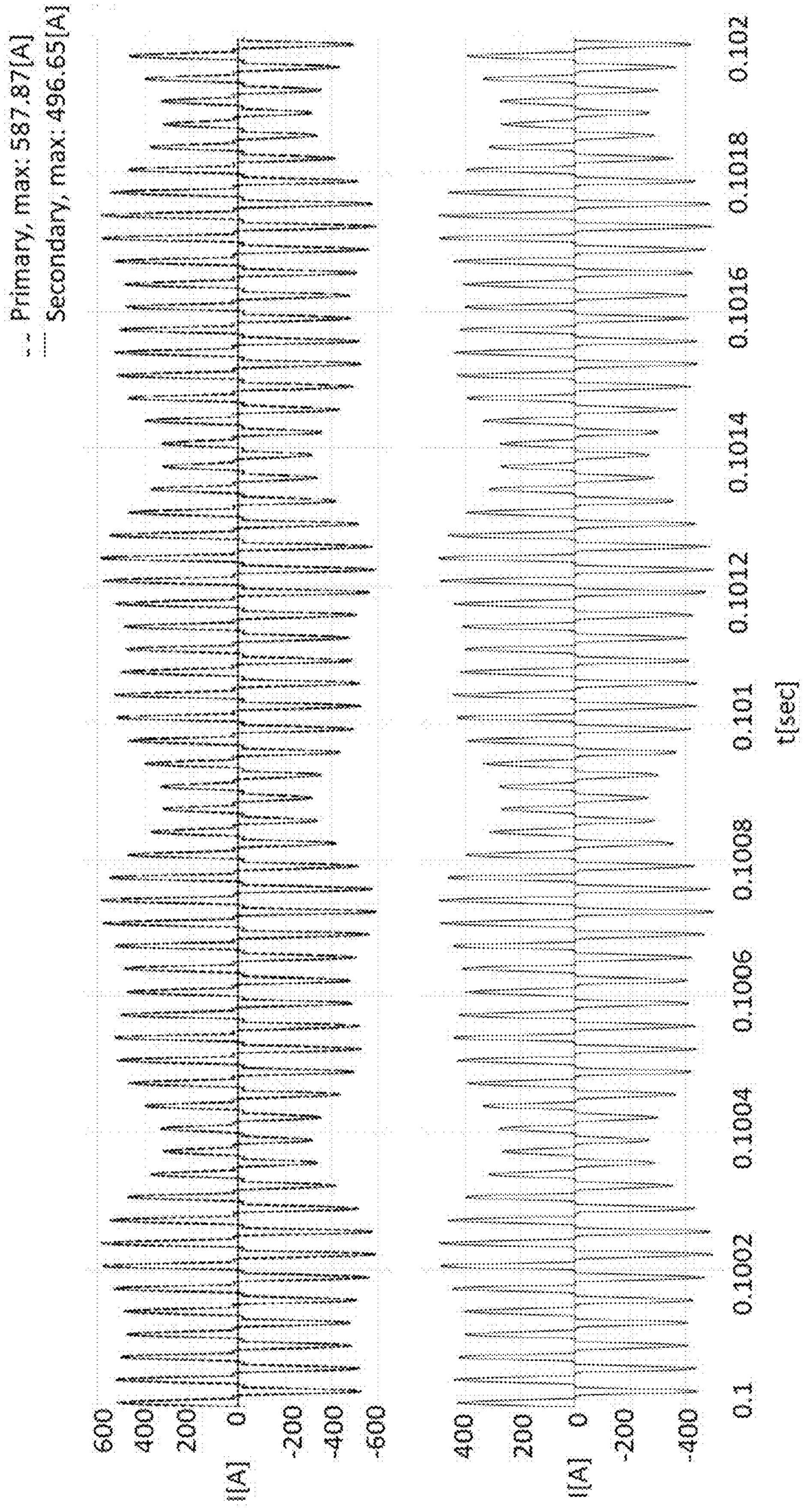
FIG. 9 is a fourth plot of a simulation of current output over time in the inverter described above according to features/parts of the disclosure herein.

FIG. 9 is a plot of a simulation of current measured over time in the inverter described above having the differential mode choke in the inverter. There is no cross connection of the windings and the capacitors 132, 133 may have a substantially lower (for example, up to 20 times lower) capacitance than in other examples. The ripple current at the primary windings have a maximum of 587.87[A]. The ripple current at the secondary windings have a maximum of 496.65[A].

Figure 10:
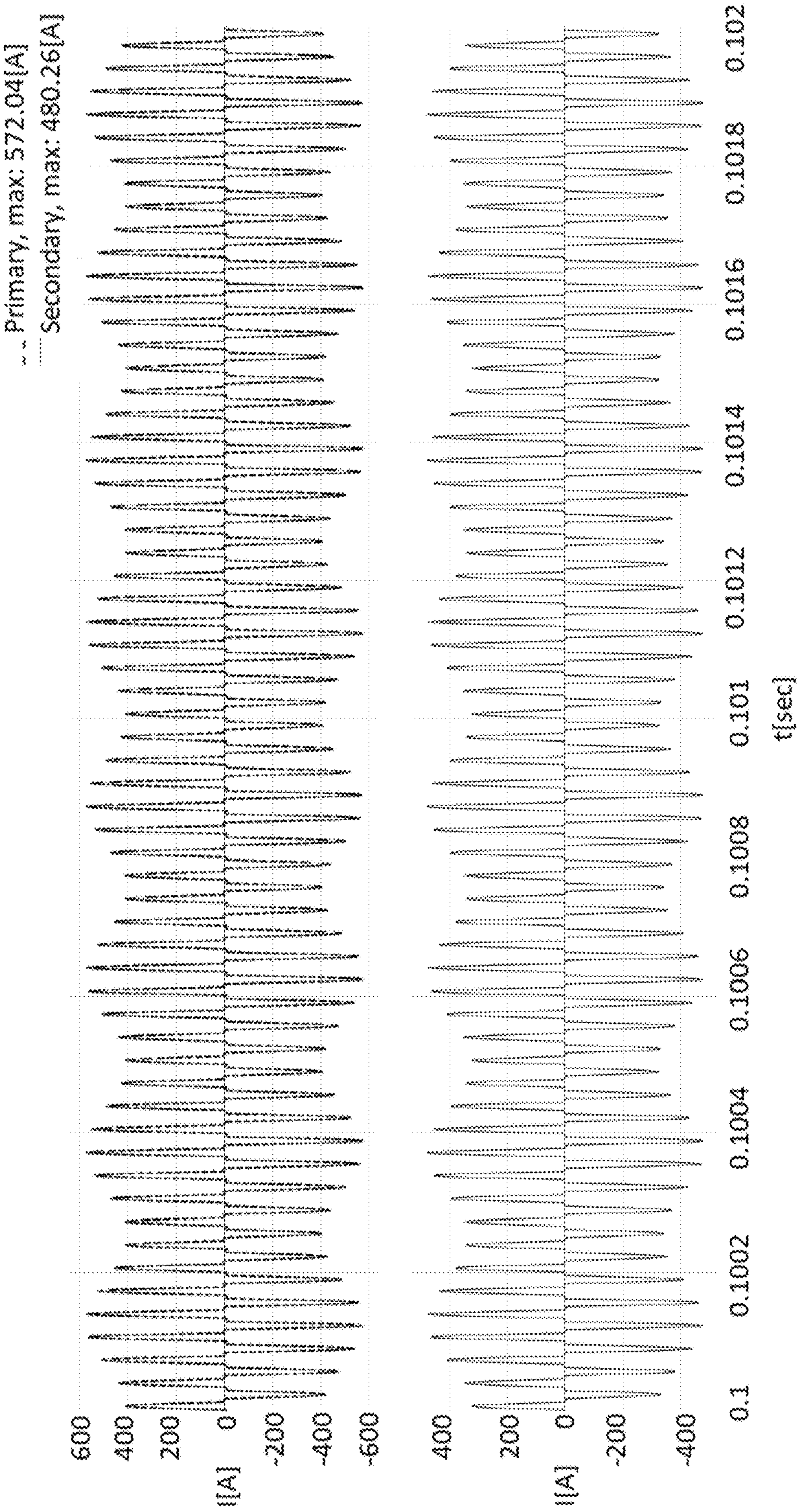
FIG. 10 is a fifth plot of a simulation of current output over time in the inverter described above according to features/parts of the disclosure herein.

FIG. 10 is a plot of a simulation of current measured over time in the inverter described above having all of transformer cross connection (i.e., the primary and secondary windings are wound as depicted in FIG. 2C) and the differential mode choke. The capacitors may have a substantially higher capacitance (up to 20 times higher) than in other examples. The ripple current at the primary windings have a maximum of 572.04[A]. The ripple current at the secondary windings have a maximum of 480.26[A].

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting. For example, elements of the inverter disclosed herein may be adapted (e.g., by changing a control method of the inverter) to implement a direct current to direct current (DC/DC) converter. As another example, a power flow direction of the inverter may be reversed, i.e., the inverter may be operated as an AC/DC converter. As still another example, the windings described as being bifilar might be trifilar, quadrifilar, n-filar, etc.

The skilled person will appreciate that inventive aspects disclosed herein include an apparatus or a system as in any of the following clauses:

Clauses:

1. An apparatus including an inverter including terminals operative to receive a direct current (DC) input, the DC input divided into a first DC sub-input and a second DC sub-input, wherein the first DC sub-input is input into a first inversion module and the second DC sub-input is input into a second inversion module, wherein the first inversion module includes a first winding around a common core, and the second inversion module includes a second winding around the common core.

2. The apparatus according to clause 1, wherein the first DC sub-input and the second DC sub-input include a ripple current at a higher frequency than a ripple current output of the first inversion module.

3. The apparatus according to any of the above clauses, wherein the first inversion module includes a first switching circuit at the first inversion module input and a second switching circuit at the first inversion module output, and the first switching circuit is operating at a higher frequency than the second switching circuit.

4. The apparatus according to clause 3, wherein the first switching circuit includes a first H-bridge.

5. The apparatus according to clause 4, wherein the first H-bridge operates at a frequency of about 30 KHz.

6. The apparatus according to clause 4, wherein the first H-bridge operates at a frequency between 1 Hz-10 MHz.

7. The apparatus according to clause 4, wherein the first H-bridge operates at a frequency between 16 KHz-200 KHz.

8. The apparatus according to clause 3, wherein the second switching circuit includes a second H-bridge.

9. The apparatus according to clause 8, wherein the second H-bridge operates at a frequency of about 2 kHz.

10. The apparatus according to clause 8, wherein the second H-bridge operates at a frequency between 1 Hz-10 MHz.

11. The apparatus according to clause 8, wherein the second H-bridge operates at a frequency between 16 KHz-200 KHz.

12. The apparatus according to any of the above clauses, wherein the first winding around the common core and the second winding around the common core include a bifilar winding around the common core.

13. The apparatus according to any of the above clauses, wherein the first winding around the common core and the second winding around the common core include a bifilar winding around a first leg of the common core.

14. The apparatus according to clause 13, wherein the first winding around the common core includes between 8 and 12 loops around the first leg of the common core.

15. The apparatus according to clause 13, wherein the second winding around the common core includes between 8 and 12 loops around the first leg of the common core.

16. The apparatus according to any of the above clauses, wherein the second inversion module includes a third switching circuit at the second inversion module input and a fourth switching circuit at the second inversion module output, and the third switching circuit is operating at a higher frequency than the fourth switching circuit.

17. The apparatus according to clause 16, wherein the third switching circuit includes a third H-bridge.

18. The apparatus according to clause 17, wherein the third H-bridge operates at a frequency of about 30 KHz.

19. The apparatus according to clause 17, wherein the third H-bridge operates at a frequency between 1 Hz-10 MHz.

20. The apparatus according to clause 17, wherein the third H-bridge operates at a frequency between 16 KHz-200 KHz.

21. The apparatus according to clause 16, wherein the fourth switching circuit includes a fourth H-bridge.

22. The apparatus according to clause 21, wherein the fourth H-bridge operates at a frequency of about 2 kHz.

23. The apparatus according to clause 21, wherein the fourth H-bridge operates at a frequency between 1 Hz-10 MHz.

24. The apparatus according to clause 21, wherein the fourth H-bridge operates at a frequency between 16 KHz-200 KHz.

25. The apparatus according to any of the above clauses, wherein the first inversion module includes a third winding around the common core, and the second inversion module includes a fourth winding around the common core.

26. The apparatus according to clause 25, wherein the third winding around the common core and the fourth winding around the common core include a bifilar winding around the common core.

27. The apparatus according to clause 25, wherein the third winding around the common core and the fourth winding around the common core include a bifilar winding around a second leg of the common core.

28. The apparatus according to clause 25, wherein the third winding around the common core includes between 8 and 12 loops around the second leg of the common core.

29. The apparatus according to clause 25, wherein the fourth winding around the common core includes between 8 and 12 loops around the second leg of the common core.

30. The apparatus according to any of the above clauses, wherein each of the first inversion module and the second inversion module includes a first switching circuit, a transformer, a rectifier, a capacitor, and a second switching circuit.

31. The apparatus according to clause 30, further including a least one capacitor disposed between a DC voltage source and the first inversion module and the second inversion module.

32. The apparatus according to clause 30, wherein the second switching circuit of the first inversion module and the second switching circuit of the second inversion module each output an AC voltage.

33. The apparatus according to clause 30, wherein the second switching circuit of the first inversion module and the second switching circuit of the second inversion module are connected in series to provide an output of the inverter.

34. The apparatus according to clause 30, wherein the second switching circuit of the first inversion module is operated at a phase-difference of 180° with respect to the second switching circuit of the second inversion module.

35. An apparatus including a magnetic core including at least two legs, two or more primary windings, and two or more secondary windings, wherein a first one of the two or more primary windings and a first one of the two or more secondary windings include a first isolation stage, wherein a second one of the two or more primary windings and a second one of the two or more secondary windings include a second isolation stage, wherein the first one of the two or more primary windings and the second one of the two or more primary windings are wound on a first leg of the at least two legs, the first one of the two or more primary windings wound on a first portion of the first leg, and the second one of the two or more primary windings is wound on a second portion of the first leg, and wherein the second one of the two or more secondary windings and the first one of the two or more secondary windings are wound on a second leg of the at least two legs, the second one of the two or more secondary windings wound on a second portion of the second leg and the first one of the two or more secondary windings wound on a first portion of the second leg.

36. The apparatus of clause 35, wherein the first one of the two or more primary windings includes between 8-12 loops around the first leg of the at least two legs.

37. The apparatus of clause 35 or clause 36, wherein the second one of the two or more primary windings includes between 8-12 loops around the first leg of the at least two legs.

38. The apparatus of clauses 35-37, wherein the first one of the two or more secondary windings includes between 8-12 loops around the second leg of the at least two legs.

39. The apparatus of clauses 35-38, wherein the second one of the two or more secondary windings includes between 8-12 loops around the second leg of the at least two legs.

40. The apparatus according to clauses 35-39, further including a third primary winding electrically connected in parallel to the first primary winding, and a fourth primary winding electrically connected in parallel to the second primary winding, wherein the fourth primary winding and the third primary winding are wound on the first leg of the at least two legs.

41. The apparatus of clause 40, wherein the third primary winding includes between 8-12 loops around the first leg of the at least two legs.

42. The apparatus of clause 40 or 41, wherein the fourth primary winding includes between 8-12 loops around the first leg of the at least two legs.

43. The apparatus according to any of clauses 40-42, wherein the third primary winding is wound on the second portion of the first leg, and the fourth primary winding is wound on the first portion of the first leg.

44. The apparatus according to any of clauses 40-43, wherein the first primary winding and the fourth primary winding form a bifilar winding.

45. The apparatus according to any of clauses 40-44, wherein the second primary winding and the third primary winding form a bifilar winding.

46. The apparatus according to any of clauses 35-46, further including a third secondary winding electrically connected in parallel to the first secondary winding, and a fourth secondary winding electrically connected in parallel to the second secondary winding, wherein the fourth secondary winding and the third secondary winding are wound on the second leg of the at least two legs.

47. The apparatus of clause 46, wherein the third secondary winding includes between 8-12 loops around the second leg of the at least two legs.

48. The apparatus of clause 46 or 47, wherein the fourth primary winding includes between 8-12 loops around the second leg of the at least two legs.

49. The apparatus according to any of clauses 46-48, wherein the third secondary winding is wound on the second portion of the second leg, and the fourth secondary winding is wound on the first portion of the secondary leg.

50. The apparatus according to any of clauses 46-49, wherein the first secondary winding and the fourth secondary winding form a bifilar winding.

51. The apparatus according to any of clauses 40-50, wherein the second secondary winding and the third secondary winding form a bifilar winding.

52. The apparatus according to any of clauses 35-51, wherein the first one of the two or more primary windings receives an input from one or more input switching circuits.

53. The apparatus according to clause 52, and further including a capacitor parallel to the one or more input switching circuits.

54. The apparatus according to clause 52 or clause 53, wherein the one or more input switching circuits includes one or more H-bridges.

55. The apparatus according to any of clauses 35-54, wherein the first one of the two or more primary windings outputs power to a first output switching circuit.

56. The apparatus according to clause 55, and further including a first diode bridge in parallel to the first output switching circuit.

57. The apparatus according to any of clauses 35-56, wherein an input of the first one of the two or more primary windings includes a ripple current at a higher frequency than a ripple at an output of a ripple of the first output switching circuit.

58. The apparatus according to any of clauses 35-57, wherein the second one of the two or more primary windings receives an input from one or more input switching circuits.

59. The apparatus according to clause 58, and further including a capacitor parallel to the one or more input switching circuits.

60. The apparatus according to clause 58 or 59, wherein the one or more input switching circuits includes one or more H-bridges.

61. The apparatus according to any of clauses 58-60, wherein the second one of the two or more primary windings outputs power to a second output switching circuit.

62. The apparatus according to clause 61, further including a second diode bridge in parallel to the second output switching circuit.

63. The apparatus according to any of clauses 58-62, wherein an input of the second one of the two or more primary windings includes a ripple current at a higher frequency than a ripple at an output of a ripple of the second output switching circuit.

64. An apparatus including a first switching circuit in parallel to a second switching circuit, the first switching circuit providing a direct current (DC) input to a first primary winding, the second switching circuit providing a DC input to a second primary winding, the first primary winding magnetically parallel to a first secondary winding, the second primary winding magnetically parallel to a second secondary winding, the first secondary winding outputting a DC output to a third switching circuit, and the second secondary winding outputting a DC output to a fourth switching circuit, and the third switching circuit outputting an alternating current (AC) output and the fourth switching circuit outputting an AC output, wherein the first primary winding includes a first winding and a second winding which are electrically parallel with one another, the first secondary winding includes a third winding and a fourth winding which are electrically parallel with one another, the second primary winding includes a fifth winding and a sixth winding which are electrically parallel with one another, the second secondary winding includes a seventh winding and a eighth winding which are electrically parallel with one another, and wherein the first switching circuit and the second switching circuit have a ripple current at a higher frequency than a ripple current of the third switching circuit and the fourth switching circuit.

65. The apparatus of clause 64, further including a first capacitor in parallel to the first switching circuit and the second switching circuit.

66. The apparatus of clause 64 or 65, further including a second capacitor in parallel to the first switching circuit.

67. The apparatus of either of clause 65-66, further including a third capacitor in parallel to the second switching circuit.

68. The apparatus of any of clauses 64-67, wherein the first switching circuit includes an H-bridge.

69. The apparatus of any of clauses 64-68, wherein the second switching circuit includes an H-bridge.

70. The apparatus of clause any of clauses 64-69, wherein the third switching circuit includes an H-bridge.

71. The apparatus of any of clauses 64-70, wherein the fourth switching circuit includes an H-bridge.

72. The apparatus of any of clauses 64-71, further including a first diode bridge connected between and in parallel to the third switching circuit and the first secondary winding.

73. The apparatus according to clause 72, further including a fourth capacitor connected between and in parallel to the first diode bridge and the third switching circuit.

74. The apparatus of any of clauses 64-73, further including a second diode bridge connected between and in parallel to the fourth switching circuit and the second secondary winding.

75. The apparatus according to clause 74, further including a fifth capacitor connected between and in parallel to the second diode bridge and the fourth switching circuit.

76. An apparatus including a magnetic core including at least two legs, two or more primary windings, and two or more secondary windings, wherein a first one of the two or more primary windings and a first one of the two or more secondary windings together include a first isolation stage, wherein a second one of the two or more primary windings and a second one of the two or more secondary windings together include a second isolation stage, wherein the first one of the two or more primary windings and the second one of the two or more primary windings are wound on a first leg of the at least two legs, and wherein the second one of the two or more secondary windings and the first one of the two or more secondary windings are wound on a second leg of the at least two legs.

77. The apparatus of clause 76 wherein the first one of the two or more primary windings wound on a first portion of the first leg, and the second one of the two or more primary windings is wound on a second portion of the first leg.

78. The apparatus of clause 76 or 77 wherein the second one of the two or more secondary windings wound on a second portion of the second leg and the first one of the two or more secondary windings wound on a first portion of the second leg.

79. The apparatus of any of clauses 76-78, wherein at least one of the first one of the two or more primary windings includes between 8-12 loops around the first leg of the at least two legs, and the second one of the two or more primary windings includes between 8-12 loops around the first leg of the at least two legs.

80. The apparatus of any of clauses 76-79, wherein at least one of the first one of the two or more secondary windings includes between 8-12 loops around the second leg of the at least two legs, and the second one of the two or more secondary windings includes between 8-12 loops around the second leg of the at least two legs.

81. The apparatus according to any of clauses 76-80, further including a third primary winding electrically connected in parallel to the first primary winding, and a fourth primary winding electrically connected in parallel to the second primary winding, wherein the fourth primary winding and the third primary winding are wound on the first leg of the at least two legs.

82. The apparatus of clause 81, wherein at least one of the third primary winding includes between 8-12 loops around the first leg of the at least two legs, and the fourth primary winding includes between 8-12 loops around the first leg of the at least two legs.

83. The apparatus according to clause 81 or 82, wherein the third primary winding is wound on the second portion of the first leg, and the fourth primary winding is wound on the first portion of the first leg.

84. The apparatus according to any of clauses 81-83, wherein the first primary winding and the fourth primary winding form a bifilar winding, and wherein the second primary winding and the third primary winding form a bifilar winding.

85. The apparatus according to any of clauses 76-84, further including a third secondary winding electrically connected in parallel to the first secondary winding, and a fourth secondary winding electrically connected in parallel to the second secondary winding, wherein the fourth secondary winding and the third secondary winding are wound on the second leg of the at least two legs.

86. The apparatus of clause 85, wherein at least one of the third secondary winding includes between 8-12 loops around the second leg of the at least two legs, and the fourth primary winding includes between 8-12 loops around the second leg of the at least two legs.

87. The apparatus according to any of clauses 85-86, wherein the third secondary winding is wound on the second portion of the second leg, and the fourth secondary winding is wound on the first portion of the secondary leg.

88. The apparatus according to any of clause 85-87, wherein the first secondary winding and the fourth secondary winding form a bifilar winding.

89. The apparatus according to clause 81, wherein the second secondary winding and the third secondary winding form a bifilar winding.

90. The apparatus according to any of clauses 76-89, wherein the first one of the two or more primary windings receives an input from one or more input switching circuits.

91. The apparatus according to clause 90, and further including a capacitor parallel to the one or more input switching circuits.

92. The apparatus according to clause 90 or 91, wherein the one or more input switching circuits includes one or more H-bridges.

93. The apparatus according to any of clause 76-92, wherein the first one of the two or more primary windings outputs power to a first output switching circuit.

94. The apparatus according to clause 93, and further including a first diode bridge in parallel to the first output switching circuit.

95. The apparatus according to clause 94, wherein an input of the first one of the two or more primary windings includes a ripple current at a higher frequency than a ripple at an output of a ripple of the first output switching circuit.

96. The apparatus according to any of clauses 76-95, wherein the second one of the two or more primary windings receives an input from one or more input switching circuits.

97. The apparatus according to clause 96, and further including a capacitor parallel to the one or more input switching circuits.

98. The apparatus according to clause 96 or 97, wherein the one or more input switching circuits includes one or more H-bridges.

99. The apparatus according to any of clauses 96-98, wherein the second one of the two or more primary windings outputs power to a second output switching circuit.

100. The apparatus according to clause 99, further including a second diode bridge in parallel to the second output switching circuit.

101. The apparatus according to any of clauses 96-100, wherein an input of the second one of the two or more primary windings includes a ripple current at a higher frequency than a ripple at an output of a ripple of the second output switching circuit.

The invention claimed is:

1. An apparatus comprising:

a pair of terminals, comprising a first terminal and a second terminal; and a plurality of circuits, comprising a first circuit, a second circuit, a third circuit, and a fourth circuit;

wherein:

the first circuit is connected to the first terminal;

the second circuit is connected to the second terminal;

the first circuit comprises a first winding wound around a magnetic core;

the second circuit comprises a second winding wound around the magnetic core;

the first circuit is connected in series with the second circuit between the pair of terminals, the third circuit comprises a third winding wound around the magnetic core;

the fourth circuit comprises a fourth winding wound around the magnetic core;

the first circuit is configured to produce a first ripple current in the first winding, the second circuit is configured to produce a second ripple current in the second winding;

the third circuit is configured to produce a third ripple current in the third winding;

the fourth circuit is configured to produce a fourth ripple current in the fourth winding;

the first and the second ripple currents are at a first frequency; and the third and fourth ripple currents are at a second frequency that is different from the first frequency.

2. The apparatus according to claim 1, wherein the second frequency is higher than the first frequency.

3. The apparatus according to claim 1, wherein the plurality of circuits each comprise an H-bridge.

4. The apparatus according to claim 1, wherein the first, the second, the third and the fourth ripple currents are superimposed on the magnetic core.

5. The apparatus according to claim 1, wherein the plurality of circuits are further configured to reduce peak ripple amplitudes.

6. The apparatus according to claim 1, wherein the plurality of circuits are further configured to reduce conduction losses.

7. The apparatus according to claim 1, wherein the plurality of circuits are further configured so that the first ripple current and the second ripple current are out of phase with one another, and the third ripple current and the fourth ripple current are out of phase with one another.

8. The apparatus according to claim 1, wherein the first winding and the second winding comprise first cross-connected winding arrangements, the third winding and the fourth winding comprise second cross-connected winding arrangements, and the first and the second cross-connected winding arrangements are configured to reduce ripple current amplitudes.

9. The apparatus according to claim 1, further comprising a differential mode choke configured to reduce ripple current components.

10. The apparatus according to claim 1, further comprising capacitor circuitry configured to stabilize voltages.

11. The apparatus according to claim 1, further comprising first capacitor circuitry connected to the first circuit and second capacitor circuitry connected to the second circuit.

12. The apparatus according to claim 11, further comprising third capacitor circuitry connected to the third circuit and fourth capacitor circuitry connected to the fourth circuit.

13. The apparatus according to claim 1, wherein the pair of terminals are alternating-current (AC) terminals.

14. The apparatus according to claim 1, wherein the third circuit is connected in parallel with the fourth circuit between a second pair of terminals.

15. The apparatus according to claim 14, wherein the second pair of terminals are direct-current (DC) terminals.

16. The apparatus according to claim 1, further comprising rectifier circuitry configured to convert AC to DC.

17. The apparatus according to claim 1, wherein the second frequency is greater than 16 kHz.

18. The apparatus according to claim 1, further comprising a fifth circuit coupled to the magnetic core by a fifth set of windings.

19. The apparatus according to claim 18, further comprising a sixth circuit coupled to the magnetic core by a sixth set of windings.

20. The apparatus according to claim 19, wherein the fifth circuit and the sixth circuit each comprise an H-bridge.

* * * * *